(12) United States Patent
Masubuchi et al.

(10) Patent No.: US 7,012,758 B2
(45) Date of Patent: Mar. 14, 2006

(54) PROJECTION OPTICAL SYSTEM AND PROJECTING APPARATUS PROVIDED WITH SAME

(75) Inventors: Tomokazu Masubuchi, Osaka (JP); Kohtaro Hayashi, Toyonaka (JP); Shigeru Sawamura, Osakasayama (JP)

(73) Assignee: Konica Minolta Opto, Inc., Hachioji (JP)

( * ) Notice: Subject to any disclaimer, the term of this patent is extended or adjusted under 35 U.S.C. 154(b) by 39 days.

(21) Appl. No.: 11/053,028

(22) Filed: Feb. 8, 2005

(65) Prior Publication Data

US 2005/0286136 A1    Dec. 29, 2005

(30) Foreign Application Priority Data

Jun. 29, 2004   (JP)   ............................. 2004-191256
Oct. 25, 2004   (JP)   ............................. 2004-309850

(51) Int. Cl.
 *G02B 3/00*    (2006.01)
(52) U.S. Cl. ..................... 359/651; 359/649; 359/726; 359/753; 359/682; 359/784; 359/740
(58) Field of Classification Search ........ 359/649–651, 359/726, 753, 682, 784, 740
See application file for complete search history.

(56) References Cited

U.S. PATENT DOCUMENTS

| | | | |
|---|---|---|---|
| 5,442,484 A | * | 8/1995 | Shikawa ..................... 359/651 |
| 5,745,297 A | | 4/1998 | Kaneko et al. ............. 359/651 |
| 6,144,503 A | | 11/2000 | Sugano ....................... 359/749 |
| 6,542,316 B1 | | 4/2003 | Yoneyama .................. 359/749 |
| 6,624,952 B1 | * | 9/2003 | Kuwa et al. ................ 359/726 |
| 2004/0233547 A1 | * | 11/2004 | Sugano ....................... 359/784 |

FOREIGN PATENT DOCUMENTS

JP    2003-248169 A    9/2003

* cited by examiner

*Primary Examiner*—Evelyn A. Lester
(74) *Attorney, Agent, or Firm*—Sidley Austin Brown & Wood LLP

(57) ABSTRACT

A projection optical system includes from the enlargement side a first lens unit, a mirror which is an optical path bending member, a second lens unit, and a third lens unit. The projection optical system is designed so that a condition (1), $5.5 < T_{12}/FL < 12.0$, is fulfilled. Here, $T_{12}$ is the air equivalent distance between the first lens unit and the second lens unit, and FL is the overall focal length of the projection optical system. By fulfilling the condition (1), it is unnecessary that the diameter of the first lens unit be extremely large. It is also unnecessary to change the lens shape to prevent interference between the first lens unit and the second lens units, so that an increase in the cost of the projection optical system can be suppressed.

28 Claims, 24 Drawing Sheets

HEIGHT OF INCIDENCE
SPHERICAL ABERRATION

IMAGE HEIGHT
ASTIGMATISM

DISTORTION

LATERAL CHROMATIC ABERRATION

HEIGHT OF INCIDENCE

SPHERICAL ABERRATION

IMAGE HEIGHT

ASTIGMATISM

DISTORTION

LATERAL CHROMATIC ABERRATION

HEIGHT OF INCIDENCE
SPHERICAL ABERRATION

IMAGE HEIGHT
ASTIGMATISM

DISTORTION
IMAGE HEIGHT

LATERAL CHROMATIC ABERRATION
IMAGE HEIGHT

HEIGHT OF INCIDENCE

SPHERICAL ABERRATION

IMAGE HEIGHT

ASTIGMATISM

DISTORTION

LATERAL CHROMATIC ABERRATION

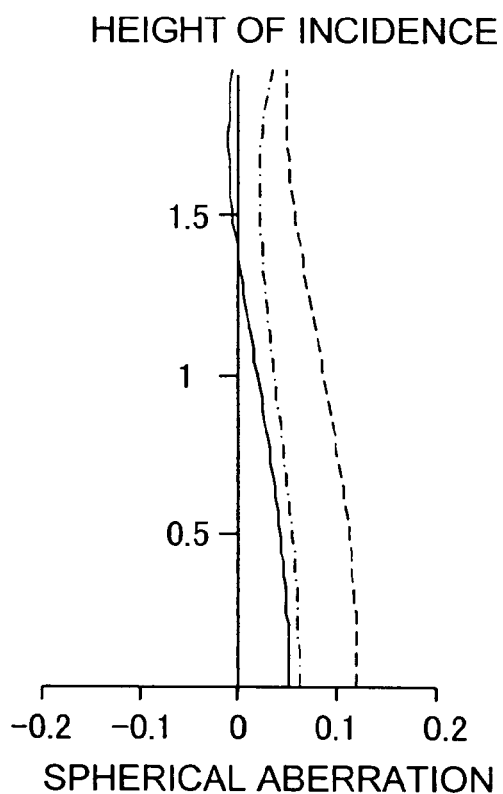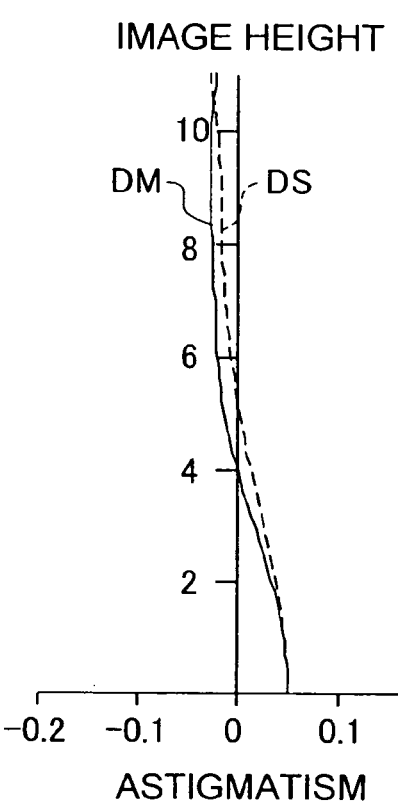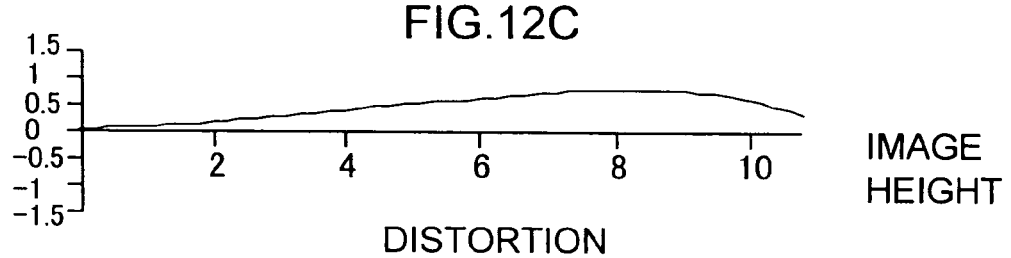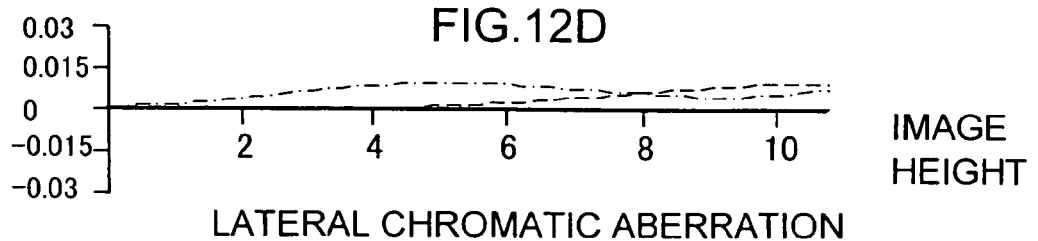

HEIGHT OF INCIDENCE

SPHERICAL ABERRATION

IMAGE HEIGHT

ASTIGMATISM

DISTORTION

LATERAL CHROMATIC ABERRATION

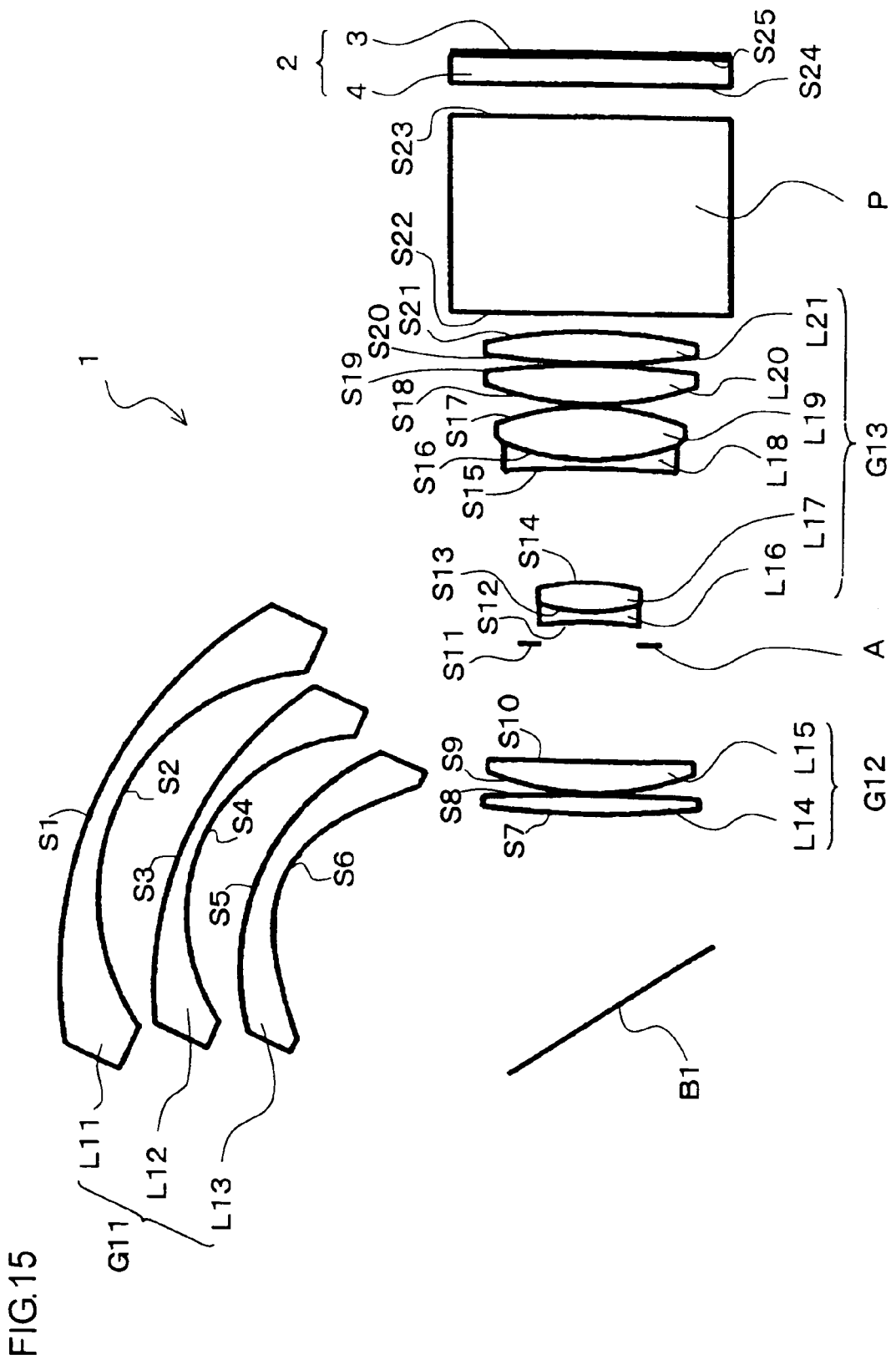

HEIGHT OF INCIDENCE
SPHERICAL ABERRATION

IMAGE HEIGHT
ASTIGMATISM

DISTORTION

LATERAL CHROMATIC ABERRATION

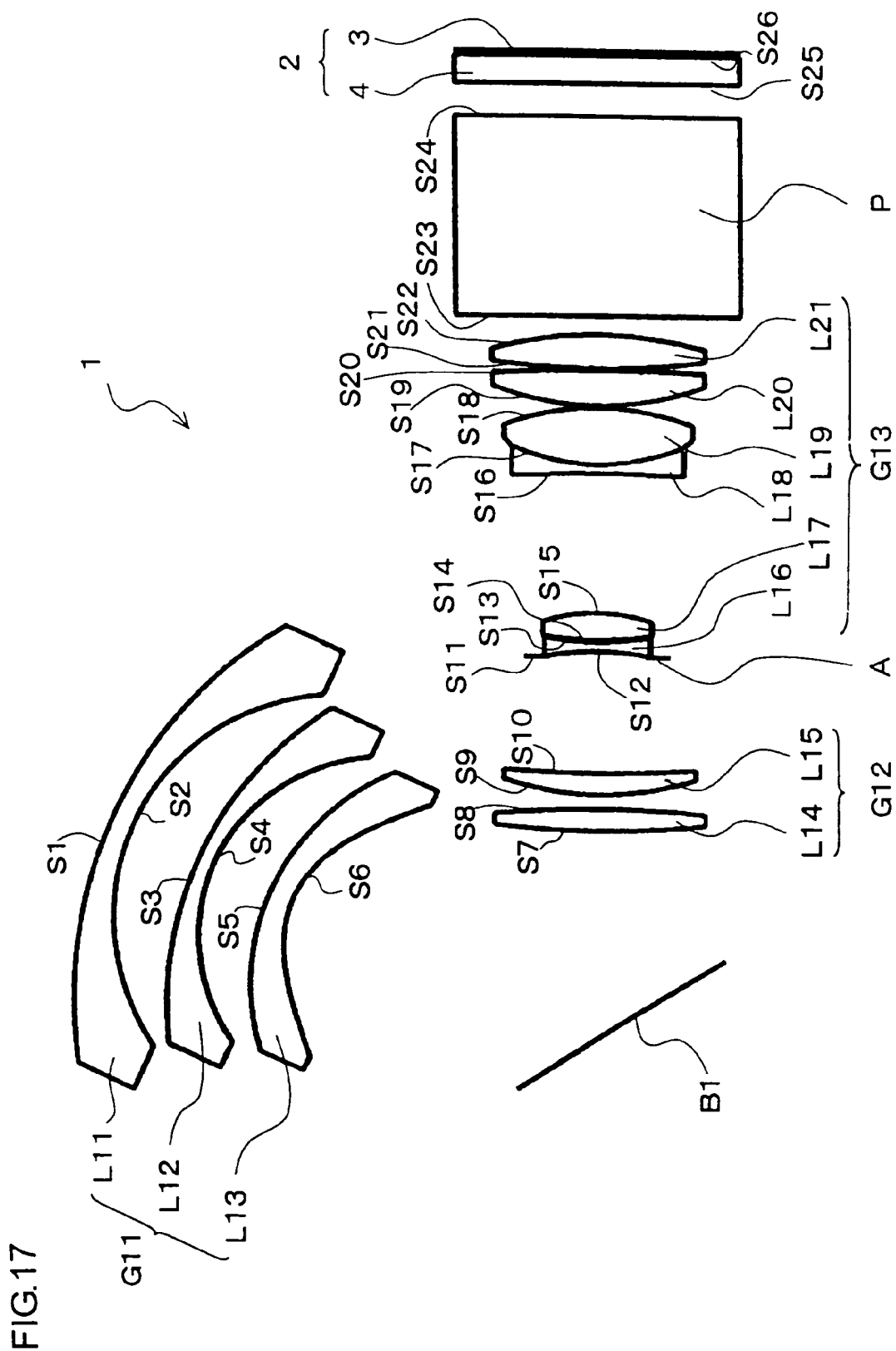

HEIGHT OF INCIDENCE

SPHERICAL ABERRATION

IMAGE HEIGHT

ASTIGMATISM

DISTORTION

LATERAL CHROMATIC ABERRATION

FIG.22A
HEIGHT OF INCIDENCE
SPHERICAL ABERRATION
FIG.22B
IMAGE HEIGHT
ASTIGMATISM
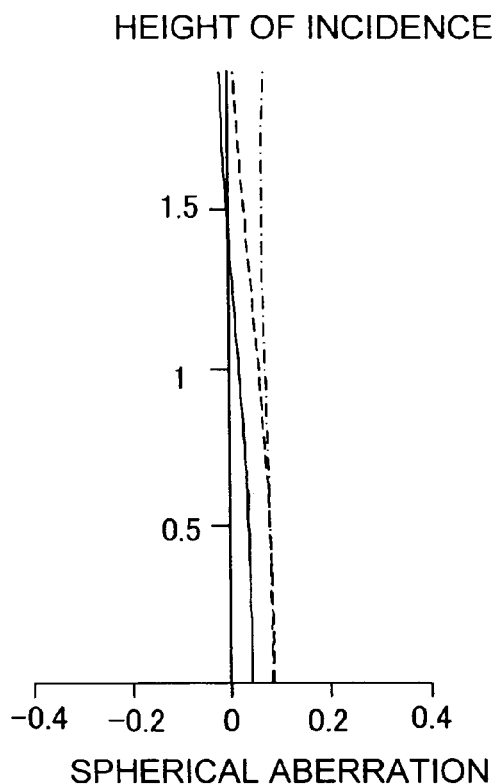
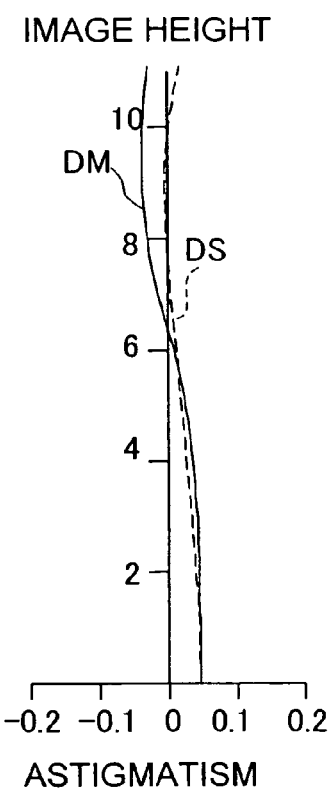
FIG.22C
DISTORTION
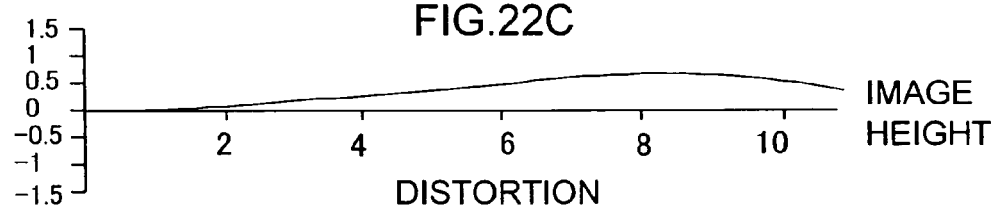
FIG.22D
LATERAL CHROMATIC ABERRATION
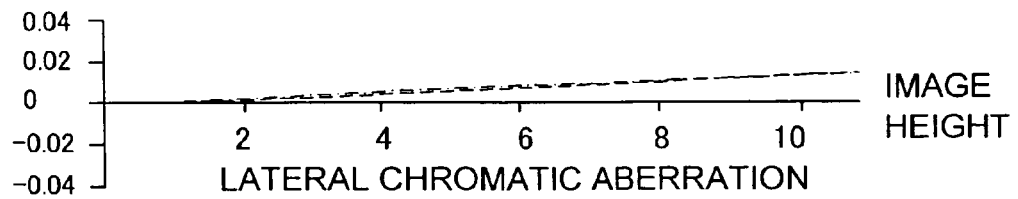

HEIGHT OF INCIDENCE

SPHERICAL ABERRATION

IMAGE HEIGHT

ASTIGMATISM

DISTORTION

LATERAL CHROMATIC ABERRATION

PROJECTION OPTICAL SYSTEM AND PROJECTING APPARATUS PROVIDED WITH SAME

This application is based on Patent Application No. 2004-191256 filed in Japan on Jun. 29, 2004, and Patent Application No. 2004-309850 filed in Japan on Oct. 25, 2004, the entire contents of which are hereby incorporated by reference.

BACKGROUND OF THE INVENTION

1. Field of the Invention

The present invention relates to a projection optical system that is used mainly for a rear projector or the like using a DMD (digital micromirror device; made of Texas Instruments Incorporated of the United States), an LCD (liquid crystal display) or the like as a display device and has a long back focal distance and whose reduction side is substantially telecentric, and a projecting apparatus having the projection optical system.

2. Description of the Prior Art

Recently, high-performance and low-priced rear projectors having a DMD or an LCD as a display device have been spreading. By installing such a rear projector, for example, in a home, it is possible to see images received through BS digital broadcasting on a large screen or see movies on a large screen as a home theater.

Display devices used for such a rear projector have been becoming smaller in size and higher in resolution than before, and projection optical systems are required to be smaller in size, higher in performance and lower in price. Moreover, in recent years, in order that too much space is not taken up in a small room, there has been a great demand for thickness reduction of the rear projector, and a wider-angle projection optical system has been becoming necessary.

Therefore, for example, in a rear projector of Patent Document 1, by disposing an optical path bending member in the middle of the optical path of the light to be projected onto the screen and bending the optical path, the overall thickness and size of the rear projector are reduced.

Patent Document 1 is Japanese Laid-Open Patent Application No. 2003-248169 (see fourth embodiment, and FIGS. 7 and 8).

However, in the rear projector of the Patent Document 1, the space for disposing the optical path bending member, that is, the air equivalent distance between a first lens unit on the enlargement side (screen side) of the optical path bending member and a second lens unit on the reduction side of the optical path bending member is not appropriately set. Consequently, there are cases where a cost increase cannot be avoided when the thickness of the rear projector is reduced, so that the reduction in the thickness of the rear projector is hindered.

That is, when the air equivalent distance is larger than necessary, the diameter of the first lens unit is larger than necessary. Consequently, the cost of the first lens unit increases. Conversely, when the air equivalent distance is smaller than necessary, in order to prevent interference (collision) between the first lens unit and the second lens unit by the bend of the optical path, it is necessary to change the shape of these lens units (for example, to cut the lens elements at the surfaces parallel to the optical axis into an oval shape). Consequently, the cost of the projection optical system increases by the amount necessitated by such processing.

SUMMARY OF THE INVENTION

The present invention is made to solve the above-mentioned problem, and an object thereof is to provide a projection optical system with which the thickness of a projecting apparatus can be reduced while a cost increase is suppressed, by appropriately setting the space for disposing the optical path bending member, and the projecting apparatus.

To achieve the above-mentioned object, a projection optical system of the present invention comprises from the enlargement side: a first lens unit having negative optical power; an optical path bending member (for example, a mirror or a prism) that bends the optical path at a reflecting surface; a second lens unit comprising a plurality of positive lens elements and having positive optical power; and a third lens unit having positive optical power, and the following condition (1) is fulfilled:

$$5.5 < T_{12}/FL < 12.0 \qquad (1)$$

where $T_{12}$ is the air equivalent distance between the first lens unit and the second lens unit and FL is the overall focal length of the projection optical system.

When the upper limit of the condition (1) is exceeded, it is necessary that the diameter of the first lens unit be extremely large. Consequently, the cost of the first lens unit increases, so that it is difficult to realize an inexpensive projection optical system and the size of the projecting apparatus increases. Conversely, when the lower limit of the condition (1) is exceeded, in order to prevent interference between the first lens unit and the second lens unit, it is necessary to change the lens shape, for example, to an oval shape. Consequently, the costs of the first and second lens units are increased, so that it is difficult to realize an inexpensive projection optical system.

Therefore, by designing the projection optical system so that the condition (1) is fulfilled and appropriately setting the space for disposing the optical path bending member, the thickness of the projecting apparatus can be reduced while an increase in the cost of the projection optical system is suppressed.

Moreover, a projecting apparatus according to the present invention comprises the above-described projection optical system and a display device that supplies the projection optical system with light corresponding to a display image. With this structure, the thickness of the projecting apparatus can be reduced while an increase in the overall cost of the apparatus is suppressed.

DESCRIPTION OF THE DRAWINGS

This and other objects and features of the present invention will become clear from the following description taken in conjunction with the preferred embodiments with reference to the accompanying drawings in which:

FIGS. 12A to 12D are explanatory views showing aberrations of the sixth embodiment of the present invention;

FIG. 15 is an explanatory view showing the schematic structure of a projecting apparatus according to an eighth embodiment of the present invention;

FIG. 17 is an explanatory view showing the schematic structure of a projecting apparatus according to a ninth embodiment of the present invention;

FIGS. 22A to 22D are explanatory views showing aberrations of the eleventh embodiment of the present invention;

DESCRIPTION OF THE PREFERRED EMBODIMENTS

First Embodiment

Figure 1:
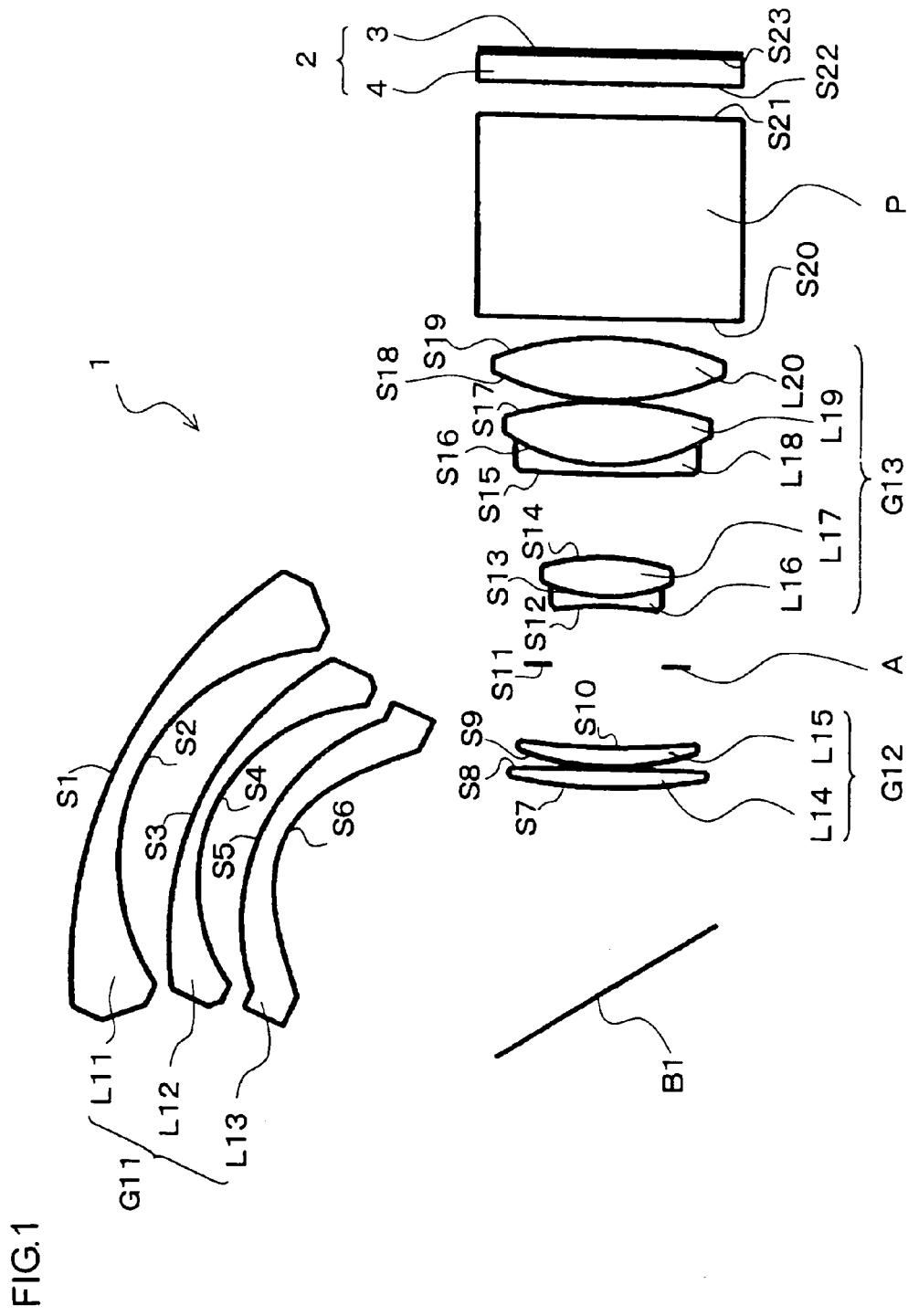
FIG. 1 is an explanatory view showing the schematic structure of a projecting apparatus according to a first embodiment of the present invention.

A first embodiment of the present invention will be described with reference to the drawings as follows:

FIG. 1 is an explanatory view showing the schematic structure of a projecting apparatus according to the present embodiment. This projecting apparatus comprises a projection optical system 1 and a DMD device 2.

The DMD device 2 comprises a DMD 3 and a cover glass 4 disposed in front (on the light reflecting side) of the DMD 3. The DMD 3 comprises micromirrors that are turned on and off in accordance with the image data of the display image which micromirrors are arranged in a matrix. The mirrors of the DMD 3 each correspond to one pixel. By changing the angle of inclination of each mirror in accordance with the image data, light from the light source (not shown) can be made selectively incident on the projection optical system 1 for each pixel. Therefore, it can be said that the DMD 3 constitutes a display device that supplies the projection optical system 1 with light corresponding to the display image.

The projection optical system 1 is an optical system for projecting light incident through the DMD device 2 onto a screen (not shown) to as to be enlarged, and comprises from the enlargement side: a first lens unit G11, a mirror B1, a second lens unit G12, a diaphragm A, a third lens unit G13 and a prism P.

The first lens unit G11 comprises three meniscus lens elements L11, L12 and L13 convex to the enlargement side, and is overall negative. The diameters of the lens elements L11, L12 and L13 increase toward the enlargement side. Moreover, at least one of the enlargement side surface and the reduction side surface of at least one of the lens elements L11, L12 and L13 is aspherical. With this, off-axial aberrations such as astigmatism, distortion and coma aberration can be well-balancedly corrected.

The mirror B1 is an optical path bending member that bends the optical path from the reduction side toward the enlargement side, that is, the optical path from the second lens unit G12 to the first lens unit G11 at a reflecting surface. When the optical path bending member comprises the mirror B1, the cost of the optical path bending member is lower than when the optical path bending member comprises, for example, a prism. Moreover, although the reduction in the size of the projection optical system 1 and the size of the projecting apparatus can be easily achieved when the optical path bending member comprises a prism, when the assembly precision is considered, it is easier that the optical path bending member comprises the mirror B1.

The second lens unit G12 comprises a plurality of positive lens elements, and is overall positive. In the present embodiment, the second lens unit G12 comprises two positive lens elements L14 and L15.

To reduce the diameter of the first lens unit G11 to suppress an increase in the cost of the first lens unit G11, it is preferable to increase the optical power of the second lens unit G12 (reduce the luminous flux diameter). However, when the second lens unit G12 comprises one positive lens element, since its curvature is sharp, aberrations are severe. Moreover, when the second lens unit G12 comprises three or more positive lens elements, the cost of the second lens unit G12 increases. Therefore, by the second lens unit G12 comprising two positive lens elements which are a minimum necessary number of lens elements, aberrations can be suppressed with a simple structure while an increase in the costs of the first lens unit G11 and the second lens unit G12 is avoided.

In particular, in the present embodiment, the lens element L14 which is the most enlargement side positive lens element of the second lens unit G12 comprises a positive lens element convex to the enlargement side.

When the lens element L14 comprises a positive lens element concave to the enlargement side, since the light ray passes through a higher position than when the lens element L14 comprises a positive lens element convex to the enlargement side, aberrations are largely generated, so that it is difficult to correct spherical aberration and correct the balance between curvature of field and astigmatism and it is considered that this degrades the performance of the projection optical system 1. Therefore, by the lens element L14 comprising a positive lens element convex to the enlargement side, the generation of aberrations can be reduced to thereby avoid the degradation of the performance of the projection optical system 1.

The diaphragm A stops down the luminous flux of the light incident from the third lens unit G13 to the second lens unit G12. The diaphragm A includes not only an aperture stop that is present independently of the lens units but also a luminous flux restricting plate that restricts the axial luminous flux such as one that is integrated with a lens holder.

The third lens unit G13 comprises lens elements L16, L17, L18, L19 and L20 from the enlargement side, and is overall positive. The lens element L16 comprises a negative lens element concave to the enlargement side. The lens element L17 comprises a positive lens element convex to the reduction side. These lens elements L16 and 17 are cemented together into a doublet lens element. The lens element L18 comprises a negative lens element. The lens element L19 comprises a positive lens element convex to the reduction side. These lens elements L18 and L19 are cemented together into a doublet lens element. The lens element L20 comprises a positive lens element. With this structure of the third lens unit G13, lateral chromatic aberration can be effectively reduced. A positive lens element may be further provided on the reduction side of the lens element L20.

Next, the setting of the air equivalent distance which is the most characteristic part of the present invention will be described.

In the present embodiment, the projection optical system 1 is designed so that the following condition (1) is fulfilled, $$5.5 < T_{12}/FL < 12.0 \qquad (1)$$

where $T_{12}$ is the air equivalent distance between the first lens unit G11 and the second lens unit G12 (the air equivalent optical path length between the most reduction side surface of the first lens unit G11 and the most enlargement side surface of the second lens unit G12) and FL is the overall focal length of the projection optical system 1.

When the upper limit of the condition (1) is exceeded, the space for disposing the optical path bending member (in the present embodiment, the mirror B1) is too large and this makes it necessary that the diameter of the first lens unit G11 be extremely large. Consequently, the cost of the first lens unit G11 increases, so that the projection optical system 1 cannot be inexpensively realized and the size of the projecting apparatus increases.

On the other hand, when the lower limit of the condition (1) is exceeded, the space for disposing the optical path bending member is too small, so that it is difficult to bend the optical path while maintaining a small F number and the degree of freedom of the disposition of the optical path bending member decreases. Moreover, even if it is possible to bend the optical path, to prevent interference between the first lens unit G11 and the second lens unit G12, it is necessary, for example, to change the shapes of the first lens unit G11 and the second lens unit G12, for example, to an oval shape. Consequently, the costs of these lens units increase, so that the projection optical system 1 cannot be inexpensively realized, either.

Therefore, by designing the projection optical system 1 so that the condition (1) is fulfilled and appropriately setting the space for disposing the optical path bending member, the thickness of the projecting apparatus can be reduced while an increase in the cost of the projection optical system 1 is suppressed.

To surely obtain this effect, it is preferable that the projection optical system 1 further fulfill the following condition (1'):

$$5.9 < T_{12}/FL < 10.6 \qquad (1')$$

Moreover, when the mirror B1 is used as the optical path bending member like in the present embodiment, the lower limit of the condition (1) may be not less than 7.0 or may be not less than 8.0. Thus, the condition (1) can be set by variously combining the lower limits (5.5, 5.9, 7.0 and 8.0) and the upper limits (12.0 and 10.6).

Moreover, in the present embodiment, the projection optical system 1 is designed so that the following condition (2) is further fulfilled:

$$2.0 < FL_2/FL < 8.0 \qquad (2)$$

where $FL_2$ is the focal length of the second lens unit G12.

When the upper limit of the condition (2) is exceeded, since the positive optical power of the second lens unit G12 is too weak, the width of the luminous flux from the second lens unit G12 to the first lens unit G11 is not reduced, so that it is necessary that the air equivalent distance between the first lens unit G11 and the second lens unit G12 be long. Consequently, the diameter of the first lens unit G11 increases to increase the cost, so that an inexpensive projection optical system 1 cannot be achieved.

Conversely, when the lower limit of the condition (2) is exceeded, since the positive optical power of the second lens unit G12 is too strong and aberrations increase accordingly, it is difficult, particularly, to correct spherical aberration and correct the balance between curvature of field and astigmatism, so that the performance of the projection optical system 1 is degraded.

Therefore, by designing the projection optical system 1 so that the condition (2) is further fulfilled, an increase in the cost of the projection optical system 1 can be avoided and the generation of aberrations can be reduced to thereby avoid the degradation of the performance of the projection optical system 1.

To surely obtain this effect, it is preferable that the projection optical system 1 further fulfill the following condition (2'):

$$4.0 < FL_2/FL < 6.0 \qquad (2')$$

Moreover, the lower limit of the condition (2) may be 3.0, and the upper limit thereof may be 7.0. Therefore, the condition (2) can be set by variously combining the lower limits (2.0, 3.0 and 4.0) and the upper limits (8.0, 7.0 and 6.0).

Moreover, in the present embodiment, the projection optical system 1 is designed so that the following condition (3) is further fulfilled:

$$1.0 < |FL_1/FL| < 5.0 \qquad (3)$$

where $FL_1$ is the focal length of the first lens unit G11.

When the upper limit of the condition (3) is exceeded, since the negative optical power of the first lens unit G11 is too weak, it is difficult to secure a long back focal distance. Conversely, when the lower limit of the condition (3) is exceeded, since the negative optical power of the first lens unit G11 is too strong, it is difficult to correct off-axial aberrations, so that the performance of the projection optical system 1 is degraded.

Therefore, by designing the projection optical system 1 so that the condition (3) is further fulfilled, off-axial aberrations can be reduced while a long back focal distance is secured, so that the degradation of the performance of the projection optical system 1 can be avoided.

To surely obtain this effect, it is preferable that the projection optical system 1 further fulfill the following condition (3'):

$$1.5 < |FL_1/FL| < 3.5 \quad (3')$$

The lower limit of the condition (3) may be 2.20 or may be 2.25. Therefore, the condition (3) can be set by variously combining the lower limits (1.0, 1.5, 2.20 and 2.25) and the upper limits (5.0 and 3.5).

Moreover, in the present invention, the projection optical system 1 is designed so that the following condition (4) is further fulfilled:

$$1.5 < LB/FL < 6.0 \quad (4)$$

where LB is the lens back focal distance which is an air equivalent length from the most reduction side lens surface (the reduction side surface of the lens element L20) of the third lens unit G13 to the reduction side image surface (the display surface of the DMD device 2, that is, the light reflecting surface of the DMD 3).

When the upper limit of the condition (4) is exceeded, to secure a long back focal distance, it is necessary to increase the negative optical power of the first lens unit G11 and aberrations increase accordingly, so that the performance is degraded. Conversely, when the lower limit of the condition (4) is exceeded, a long back focal distance cannot be obtained.

Therefore, by designing the projection optical system 1 so that the condition (4) is further fulfilled, the generation of aberrations can be reduced to thereby avoid the performance degradation, and a long back focal distance can be secured.

To surely obtain this effect, it is preferable that the projection optical system 1 further fulfill the following condition (4'):

$$2.0 < LB/FL < 4.0 \quad (4')$$

Moreover, the lower limit of the condition (4) may be 2.55. Therefore, the condition (4) can be set by variously combining the lower limits (1.5, 2.0 and 2.55) and the upper limits (6.0 and 4.0).

The detailed structure of the projection optical system 1 according to the present embodiment will be described as a first example.

FIRST EXAMPLE

Table 1 shows the construction data of the projection optical system 1 according to the present example. In the present example, the F number is 2.5, the angle of view (2ω) is 90.0 degrees, and the overall focal length FL of the projection optical system 1 is 7.14 mm. Moreover, the projection distance (the axial distance from the enlargement side surface of the lens element L11 to the screen surface (projected surface)) is 701 mm.

TABLE 1

| S | CR | T | Nd | Vd |
|---|---|---|---|---|
| 1 | 51.9847 | 2.3000 | 1.6031 | 60.70 |
| 2 | 23.1831 | 7.1810 | 1.0000 | |
| 3 | 35.3281 | 1.7000 | 1.6584 | 50.90 |

TABLE 1-continued

| S | CR | T | Nd | Vd |
|---|---|---|---|---|
| 4 | 19.1710 | 5.3787 | 1.0000 | |
| 5 | 23.4029 | 2.5000 | 1.5305 | 55.72 |
| 6 | 11.1985 | 58.0287 | 1.0000 | |
| 7 | 55.0592 | 1.9967 | 1.7174 | 29.50 |
| 8 | −400.1640 | 0.2100 | 1.0000 | |
| 9 | 26.5460 | 2.1067 | 1.6200 | 36.30 |
| 10 | 72.4371 | 8.8028 | 1.0000 | |
| 11 | APR | 6.4253 | 1.0000 | |
| 12 | −33.1924 | 1.0000 | 1.8061 | 33.30 |
| 13 | 16.5257 | 4.1274 | 1.4875 | 70.40 |
| 14 | −21.2661 | 8.7953 | 1.0000 | |
| 15 | 157.2230 | 1.0000 | 1.8061 | 33.30 |
| 16 | 19.1645 | 6.7542 | 1.4875 | 70.40 |
| 17 | −33.5845 | 0.2000 | 1.0000 | |
| 18 | 27.1227 | 6.7140 | 1.4875 | 70.40 |
| 19 | −31.0917 | 2.0083 | 1.0000 | |
| 20 | INF | 21.4100 | 1.5168 | 64.20 |
| 21 | INF | 3.5000 | 1.0000 | |
| 22 | INF | 3.0000 | 1.5085 | 61.19 |
| 23 | INF | 0.5000 | 1.0000 | |

In Table 1, S represents the surface number of the n-th surface counted from the enlargement side (n is a natural number, and the reflecting surface of the mirror B1 is excluded), and the surface numbers 1 to 23 correspond to S1 to S23 in FIG. 1. Moreover, CR represents the radius of curvature (mm), T represents the axial distance (mm), Nd represents the refractive index, and Vd represents the Abbe number to the d-line.

Moreover, in the present embodiment, the sixth surface, that is, the reduction side surface of the lens element L13 is aspherical. The definition expression of the aspherical surface is expressed by the following expression 1 on a y-z cross section with the vertex as the origin and the optical axis as the x-axis:

$$X = \frac{C_j^2 h^2}{1 + \sqrt{1 - \varepsilon_j C_j^2 h^2}} + A_4 h^4 + A_6 h^{12} + A_8 h^{16} + A_{10} h^{20} + A_{12} h^{24} \quad \text{[Expression 1]}$$

where
x is the amount of sag in the direction of the optical axis at a height h with respect to the optical axis,
$c_j$ is the curvature at the vertex (the reciprocal of the radius of curvature) on the j-th surface,
h is the height of incidence of the light ray on the lens surface ($h^2 = y^2 + z^2$)
$\varepsilon_j$ is 1+k, and
k is the conic constant.

$A_4$, $A_6$, $A_8$, $A_{10}$ and $A_{12}$ are the 4-th, 12-th, 16-th, 20-th and 24-th coefficients (aspherical coefficients) of h, respectively.

Moreover, the aspherical coefficients of the sixth surface are as shown in Table 2. In Table 2, E−n=×10$^{-n}$.

TABLE 2

| S | k | $A_4$ | $A_6$ | $A_8$ |
|---|---|---|---|---|
| 6 | −0.91849 | −1.87450E−05 | −3.11319E−08 | −1.43978E−10 |

Figure 2A:
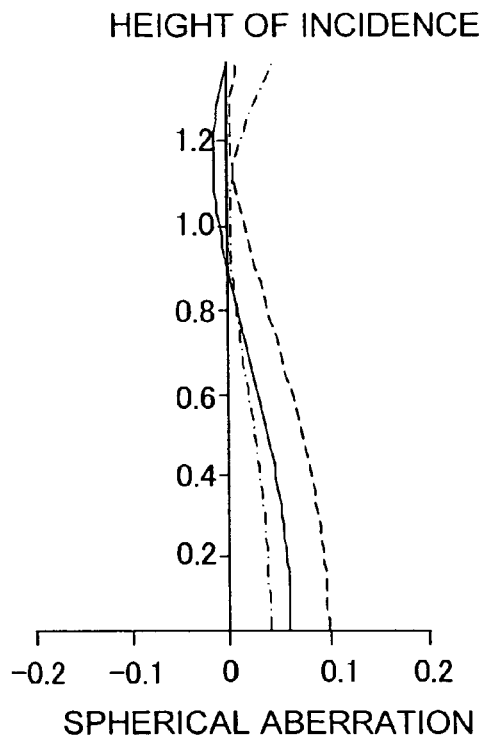
FIGS. 2A to 2D are explanatory views showing aberrations of the first embodiment of the present invention.
Figure 2B:
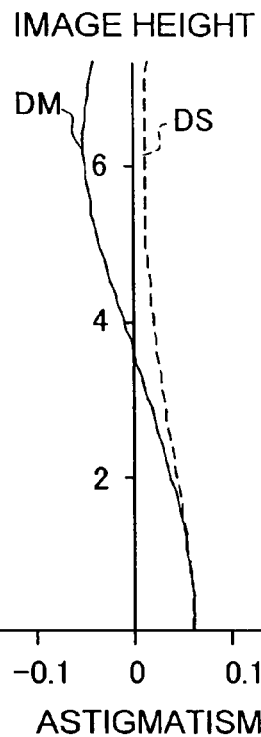
Figure 2C:
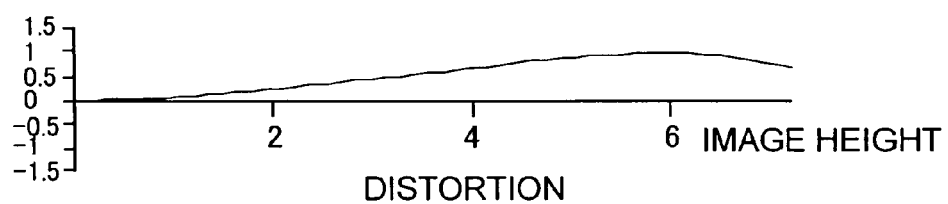
Figure 2D:
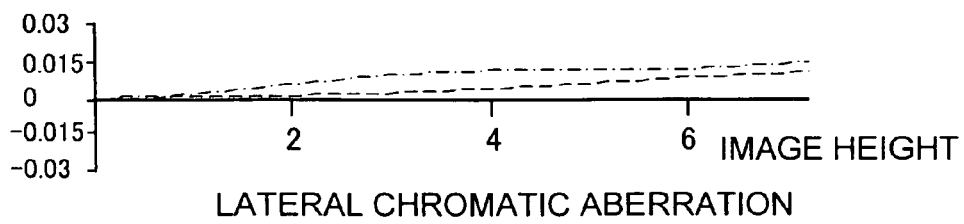

FIGS. 2A to 2D are explanatory views showing spherical aberration, astigmatism, distortion and lateral chromatic aberration in the present example. FIGS. 2A and 2D show the spherical aberration and the lateral chromatic aberration to the c-line (broken line), the e-line (solidline) and the g-line (dash and dotted line), respectively. In FIG. 2B, the solid line (DM) shows the astigmatism to the e-line on the meridional image plane, and the broken line (DS) represents the astigmatism to the e-line on the sagittal image plane. FIG. 2C shows the distortion to the e-line. The units of the vertical and horizontal axes of these figures are all (mm) except for FIG. 2C. In FIG. 2C, the unit of the vertical axis is (%), and the unit of the horizontal axis is (mm). The vertical axis of FIG. 2A shows the height of incidence on the entrance pupil.

When the present example is used in a projecting apparatus as a projection optical system, although, originally, the screen surface (projected surface) is the image surface and the device display surface (the light reflecting surface of the DMD 3) is the object surface, in the present example, the lens system is a reduction system in optical designing, and the optical performance is evaluated on the reduction side image surface (display device surface) with the screen surface being regarded as the object surface. That is, FIGS. 2A to 2D show the aberrations on the reduction side.

In the present example, the values of $T_{12}/FL$, $FL_2/FL$, $|FL_1/FL|$ and $LB/FL$ defined by the conditions (1) to (4), respectively, are as shown in Table 3.

TABLE 3

|  | condition (1) | condition (2) | condition (3) | condition (4) |
|---|---|---|---|---|
| first example | 8.12 | 4.67 | 2.27 | 3.10 |

Since the values shown in Table 3 all fulfill the conditions (1) to (4), it can be said that the above-mentioned effects are obtained. Further, since the values shown in Table 3 also fulfill the conditions (1') to (4'), it can be said that the effects are surely obtained.

Second Embodiment

A second embodiment of the present invention will be described with reference to the drawings as follows. The same structures as those of the first embodiment are denoted by the same reference numerals, and descriptions thereof are omitted.

Figure 3:
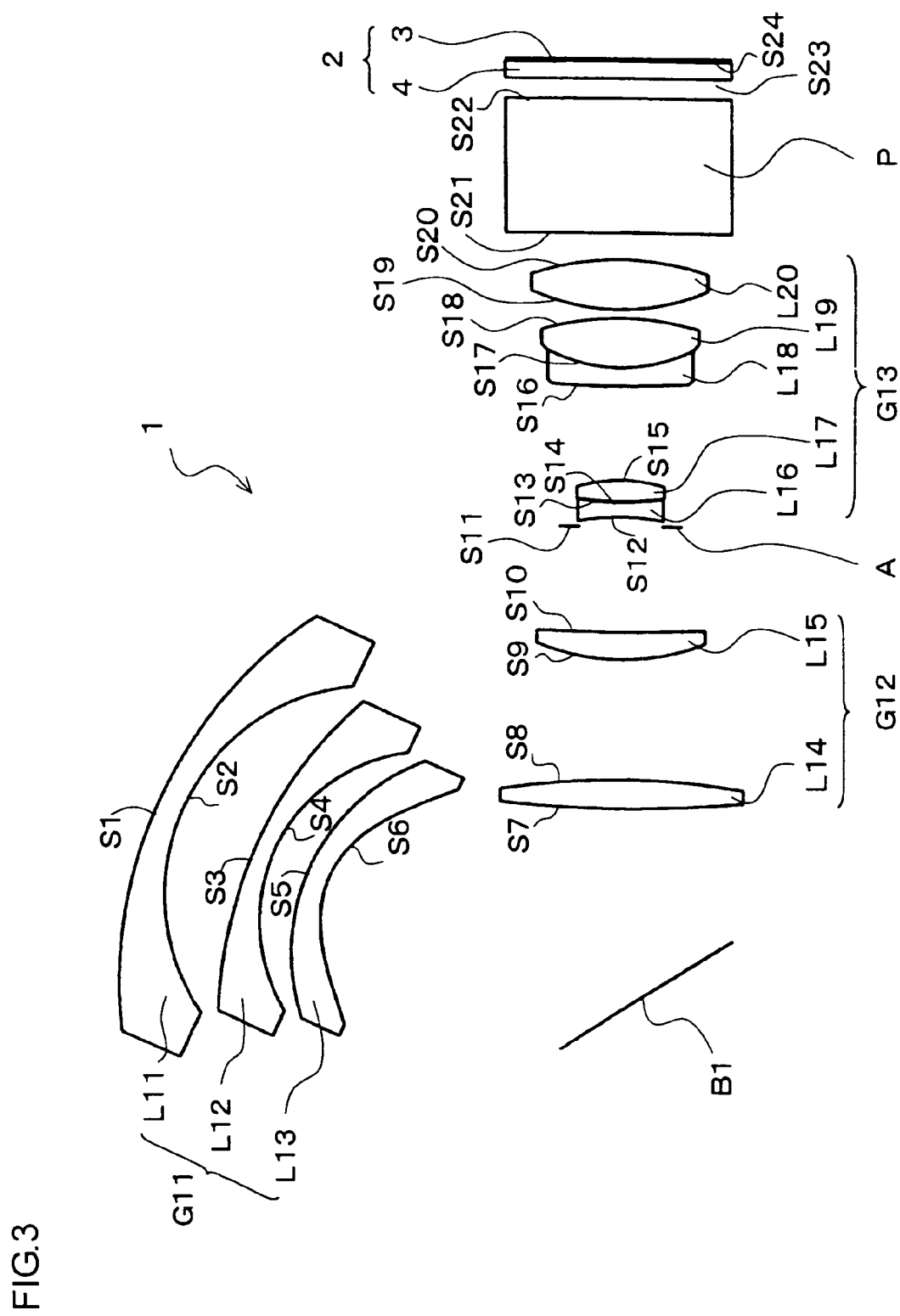
FIG. 3 is an explanatory view showing the schematic structure of a projecting apparatus according to a second embodiment of the present invention.
Figure 4A:
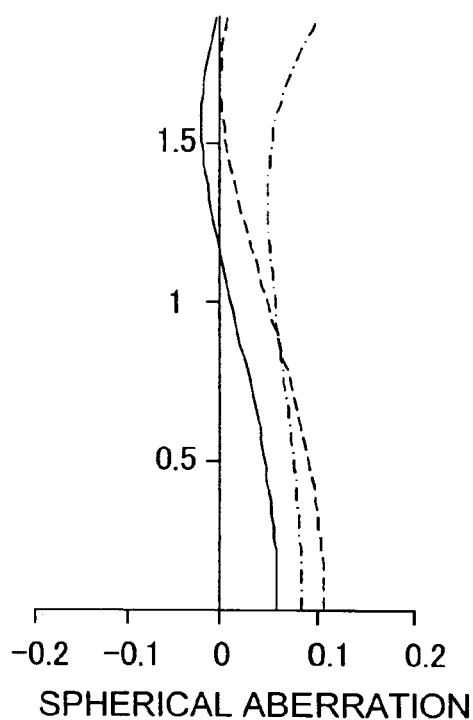
FIGS. 4A to 4D are explanatory views showing aberrations of the second embodiment of the present invention.
Figure 4B:
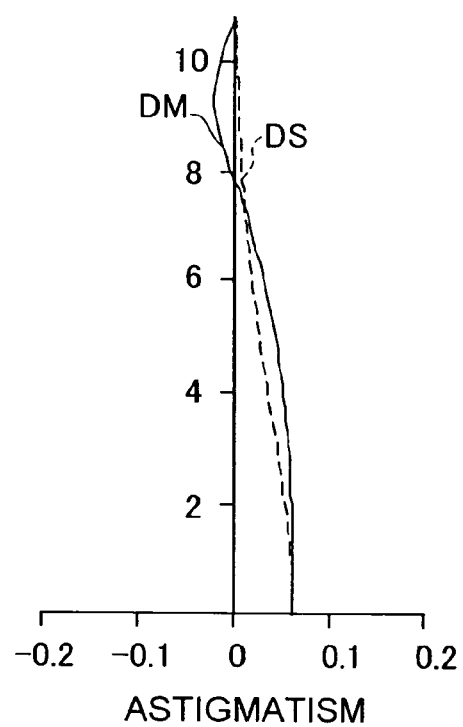
Figure 4C:
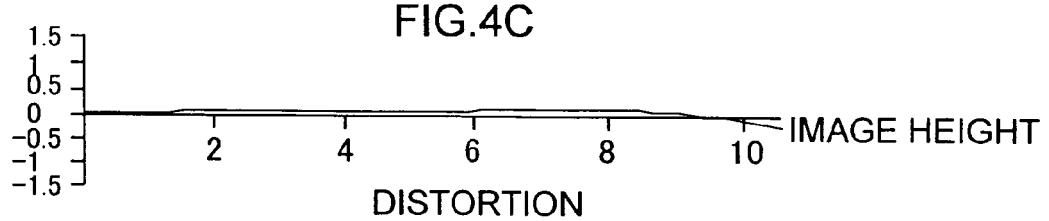
Figure 4D:
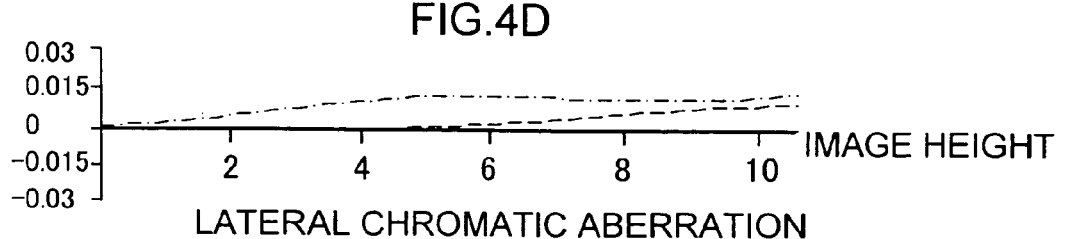

FIG. 3 is an explanatory view showing the schematic structure of a projecting apparatus according to the present embodiment. In the projecting apparatus of the present embodiment, in the projection optical system 1 of the first embodiment, the lens element L16 and the lens element L17 of the third lens unit G13 are not cemented together, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a second example.

SECOND EXAMPLE

Table 4 shows the construction data of the projection optical system 1 according to the present example. In the present example, the F number is 2.5, the angle of view (2ω) is 92.0 degrees, the overall focal length FL of the projection optical system 1 is 10.27 mm, and the projection distance is 509 mm.

TABLE 4

| S | CR | T | Nd | Vd |
|---|---|---|---|---|
| 1 | 80.4266 | 4.3000 | 1.6204 | 60.30 |
| 2 | 38.3472 | 14.6969 | 1.0000 |  |
| 3 | 79.3991 | 3.3000 | 1.6584 | 50.90 |
| 4 | 31.1625 | 6.9024 | 1.0000 |  |
| 5 | 37.7721 | 3.8000 | 1.5305 | 55.72 |
| 6 | 17.9192 | 92.0019 | 1.0000 |  |
| 7 | 196.2420 | 5.1208 | 1.7433 | 49.20 |
| 8 | −141.2040 | 21.7990 | 1.0000 |  |
| 9 | 39.2986 | 4.9293 | 1.5814 | 40.90 |
| 10 | 247.0870 | 19.1733 | 1.0000 |  |
| 11 | APR | 1.7269 | 1.0000 |  |
| 12 | −41.4259 | 2.4999 | 1.8061 | 33.30 |
| 13 | 38.6209 | 0.3322 | 1.0000 |  |
| 14 | 61.0028 | 3.8431 | 1.4875 | 70.40 |
| 15 | −27.1940 | 17.0348 | 1.0000 |  |
| 16 | 169.4990 | 3.2805 | 1.8061 | 33.30 |
| 17 | 28.2157 | 8.8764 | 1.4875 | 70.40 |
| 18 | −49.9146 | 1.5730 | 1.0000 |  |
| 19 | 37.9685 | 8.9998 | 1.4970 | 81.20 |
| 20 | −49.6922 | 4.8000 | 1.0000 |  |
| 21 | INF | 24.0000 | 1.5168 | 64.20 |
| 22 | INF | 3.5000 | 1.0000 |  |
| 23 | INF | 3.0000 | 1.5085 | 61.19 |
| 24 | INF | 0.5000 | 1.0000 |  |

The definitions of S, T, Nd and Vd in Table 4 are similar to those of the first example. In the present example, the surface numbers 1 to 24 in Table 4 correspond to S1 to S24 (the reflecting surface of the mirror B1 is excluded) in FIG. 3. Moreover, in the present example, the sixth surface is aspherical. The aspherical coefficients of the sixth surface are as shown in Table 5. In Table 5, $E-n=\times 10^{-n}$.

TABLE 5

| S | k | $A_4$ | $A_6$ | $A_8$ |
|---|---|---|---|---|
| 6 | −0.88200 | −5.95803E−06 | −3.40314E−09 | −3.55198E−12 |

FIGS. 4A to 4D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 6.

TABLE 6

|  | condition (1) | condition (2) | condition (3) | condition (4) |
|---|---|---|---|---|
| second example | 8.95 | 5.10 | 2.32 | 2.59 |

Since the values shown in Table 6 all fulfill the conditions (1) to (4), it can be said that the above-mentioned effects by the definitions of the conditions are obtained. Further, since the values shown in Table 6 also fulfill the conditions (1') to (4'), it can be said that the effects are surely obtained.

Third Embodiment

A third embodiment of the present invention will be described with reference to the drawings as follows. The same structures as those of the first or second embodiment are denoted by the same reference numerals, and descriptions thereof are omitted.

Figure 5:
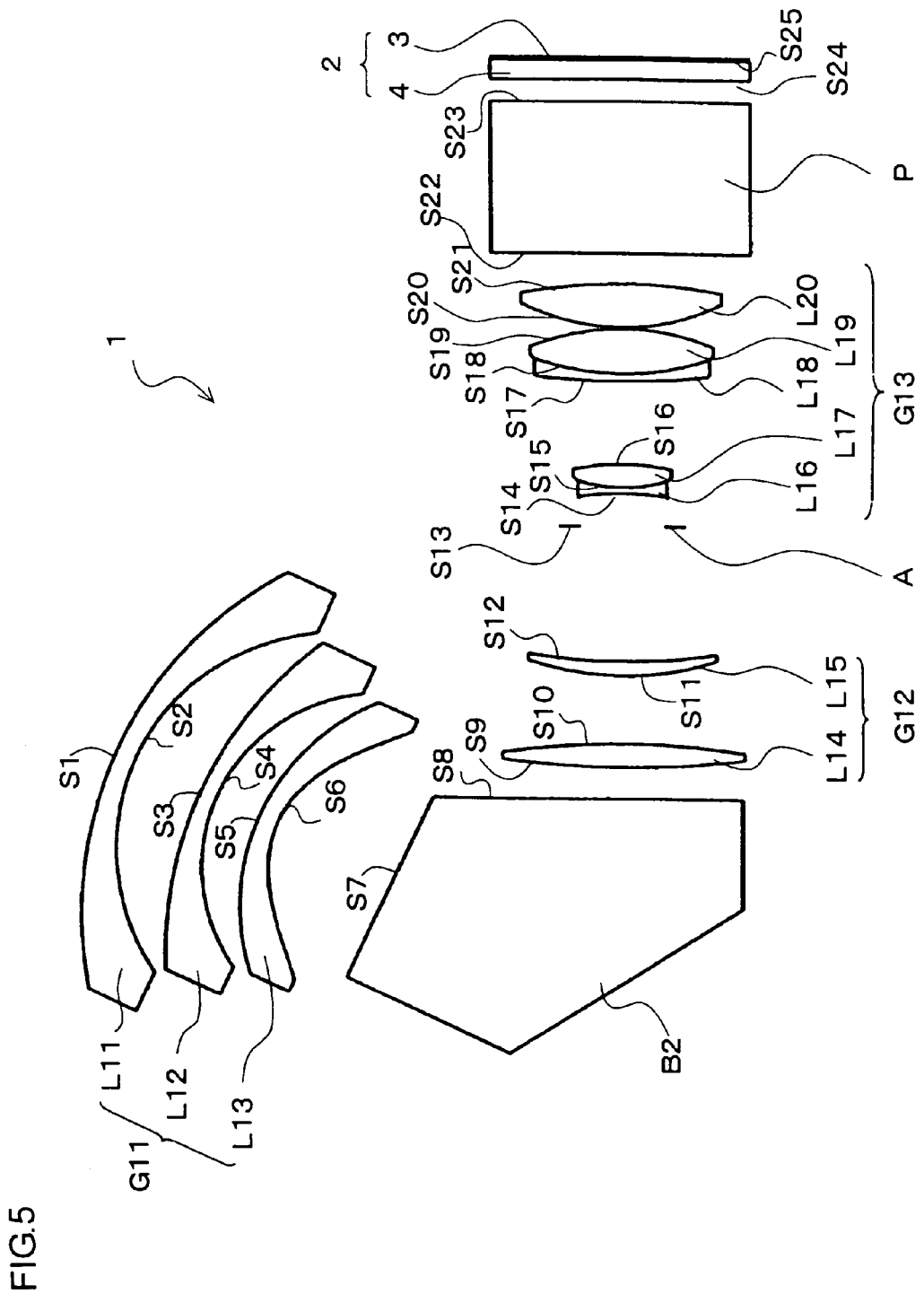
FIG. 5 is an explanatory view showing the schematic structure of a projecting apparatus according to a third embodiment of the present invention.
Figure 6A:
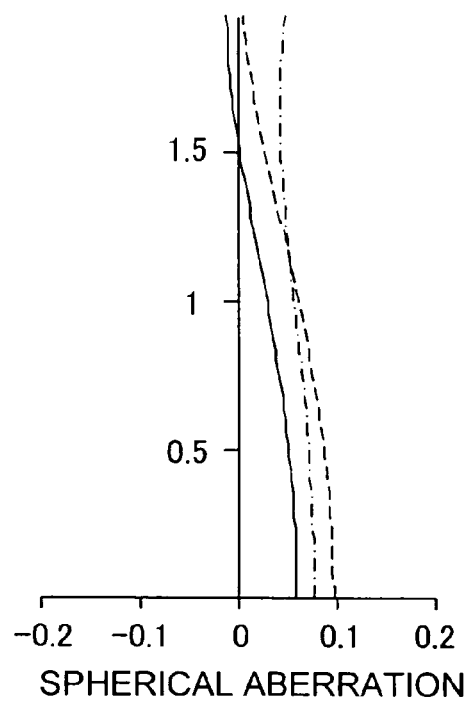
FIGS. 6A to 6D are explanatory views showing aberrations of the third embodiment of the present invention.
Figure 6B:
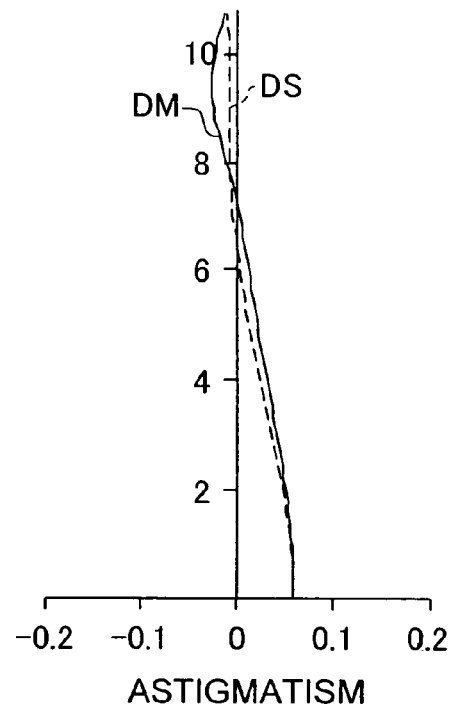
Figure 6C:
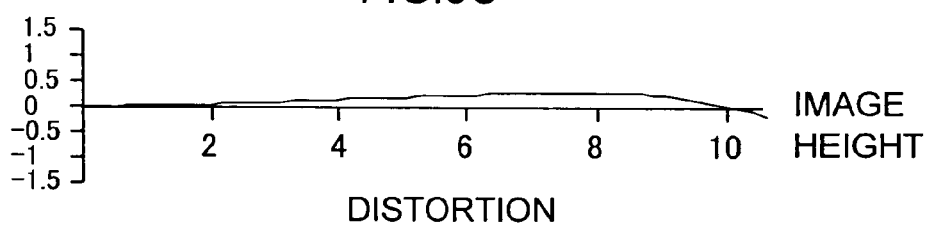
Figure 6D:
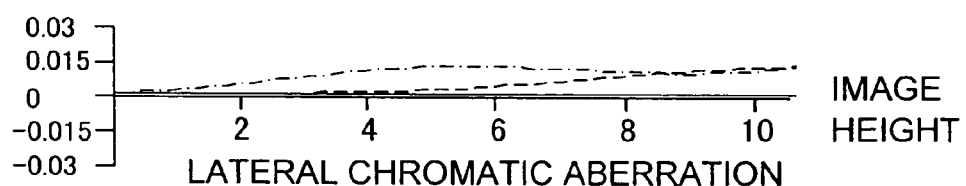

FIG. 5 is an explanatory view showing the schematic structure of a projecting apparatus according to the present embodiment. In the projecting apparatus of the present embodiment, in the projection optical system 1 of the first embodiment, the mirror B1 is replaced with a prism B2, and the parameters (the radius of curvature, the axial distance, the refractive index and the Abbe number) of each lens element are optimized accordingly. Except this, the basic structure is similar to that of the first embodiment.

The prism B2 is an optical path bending member that bends the optical path from the reduction side toward the enlargement side, that is, the optical path from the second lens unit G12 to the first lens unit G11 at a reflecting surface. By the optical path bending member comprising the prism B2, the size of the projection optical system 1 can be reduced compared to when the optical path bending member comprises a mirror.

In the present embodiment, the projection optical system 1 is also designed so that the conditions (1) to (4) shown in the first embodiment are fulfilled. The detailed structure of the projection optical system 1 according to the present embodiment will be described as a third example.

THIRD EXAMPLE

Table 7 shows the construction data of the projection optical system 1 according to the present example. In the present example, the F number is 2.5, the angle of view (2ω) is 92.0 degrees, the overall focal length FL of the projection optical system 1 is 10.27 mm, and the projection distance is 626 mm.

TABLE 7

| S | CR | T | Nd | Vd |
|---|---|---|---|---|
| 1 | 63.1684 | 3.2000 | 1.6584 | 50.90 |
| 2 | 35.0827 | 11.1511 | 1.0000 | |
| 3 | 62.5986 | 2.5000 | 1.6969 | 55.50 |
| 4 | 28.1171 | 7.1410 | 1.0000 | |
| 5 | 35.4529 | 3.0000 | 1.5305 | 55.72 |
| 6 | 16.4013 | 20.0000 | 1.0000 | |
| 7 | INF | 68.0000 | 1.5168 | 64.20 |
| 8 | INF | 5.0000 | 1.0000 | |
| 9 | 144.4860 | 3.7698 | 1.7859 | 43.90 |
| 10 | −127.0330 | 10.9150 | 1.0000 | |
| 11 | 44.0230 | 2.2730 | 1.8340 | 37.30 |
| 12 | 85.0514 | 21.6281 | 1.0000 | |
| 13 | APR | 5.2112 | 1.0000 | |
| 14 | −54.9227 | 1.0000 | 1.8061 | 33.30 |
| 15 | 22.8877 | 3.7423 | 1.4875 | 70.40 |
| 16 | −37.9554 | 13.3324 | 1.0000 | |
| 17 | 124.3840 | 1.2000 | 1.8061 | 33.30 |
| 18 | 40.0839 | 7.2286 | 1.4875 | 70.40 |
| 19 | −35.8643 | 0.2000 | 1.0000 | |
| 20 | 33.4548 | 6.9521 | 1.4970 | 81.20 |
| 21 | −83.4014 | 4.8330 | 1.0000 | |
| 22 | INF | 24.0000 | 1.5168 | 64.20 |
| 23 | INF | 3.5000 | 1.0000 | |
| 24 | INF | 3.0000 | 1.5085 | 61.19 |
| 25 | INF | 0.5000 | 1.0000 | |

The definitions of S, T, Nd and Vd in Table 7 are similar to those of the first embodiment. In the present example, the surface numbers 1 to 25 in Table 7 correspond to S1 to S25 (the reflecting surface of the prism B2 is excluded) in FIG. 5. Moreover, S7 and S8 represent the light exit surface and the light incident surface of the prism B2. Moreover, in the present example, the sixth surface is aspherical. The aspherical coefficients of the sixth surface are as shown in Table 8. In Table 8, E−n=×10$^{-n}$.

TABLE 8

| S | k | $A_4$ | $A_6$ | $A_8$ |
|---|---|---|---|---|
| 6 | −0.86672 | −7.28644E−06 | −4.40925E−09 | −1.05076E−11 |

FIGS. 6A to 6D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and LB/FL defined by the conditions (1) to (4), respectively, are as shown in Table 9.

TABLE 9

| | condition (1) | condition (2) | condition (3) | condition (4) |
|---|---|---|---|---|
| third example | 6.80 | 4.89 | 2.22 | 2.59 |

Since the values shown in Table 9 all fulfill the conditions (1) to (4), it can be said that the above-mentioned effects by the definitions of the conditions are obtained. Further, since the values shown in Table 9 also fulfill the conditions (1') to (4'), it can be said that the effects are surely obtained.

Fourth Embodiment

A fourth embodiment of the present invention will be described with reference to the drawings as follows. The same structures as those of the first to third embodiments are denoted by the same reference numerals, and descriptions thereof are omitted.

Figure 7:
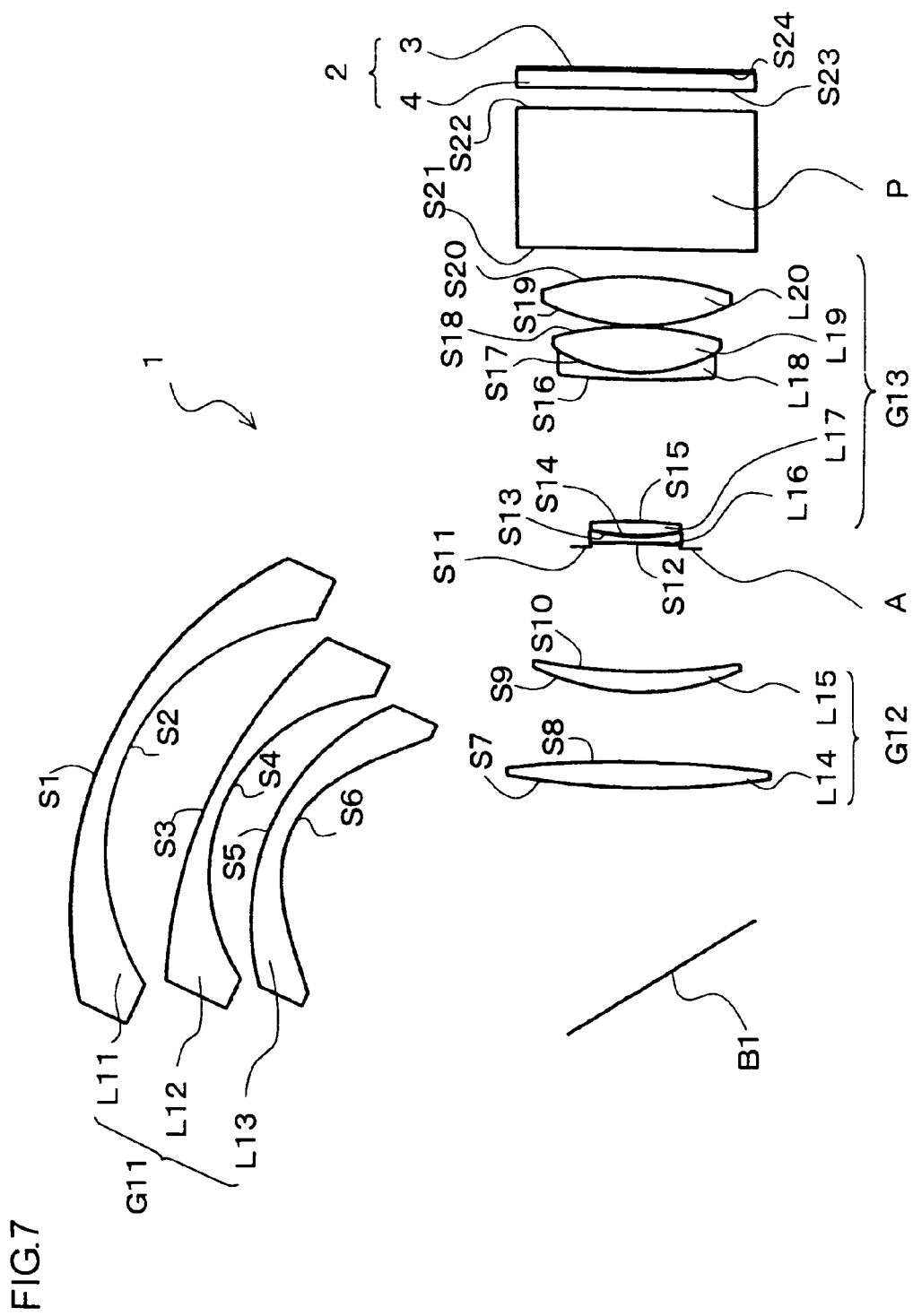
FIG. 7 is an explanatory view showing the schematic structure of a projecting apparatus according to a fourth embodiment of the present invention.
Figure 8A:
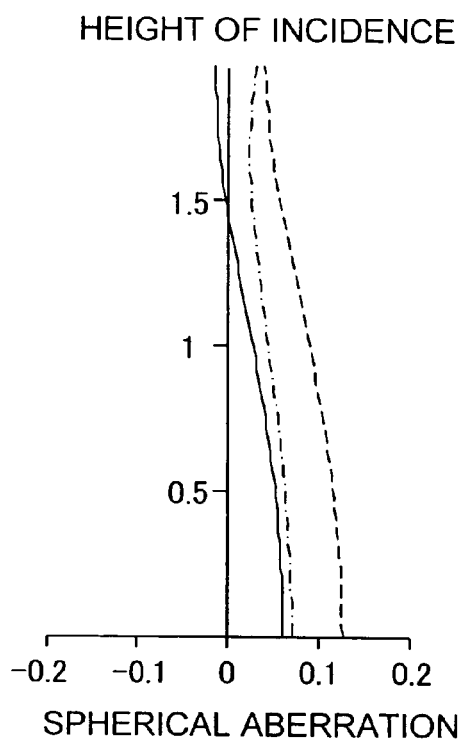
FIGS. 8A to 8D are explanatory views showing aberrations of the fourth embodiment of the present invention.
Figure 8B:
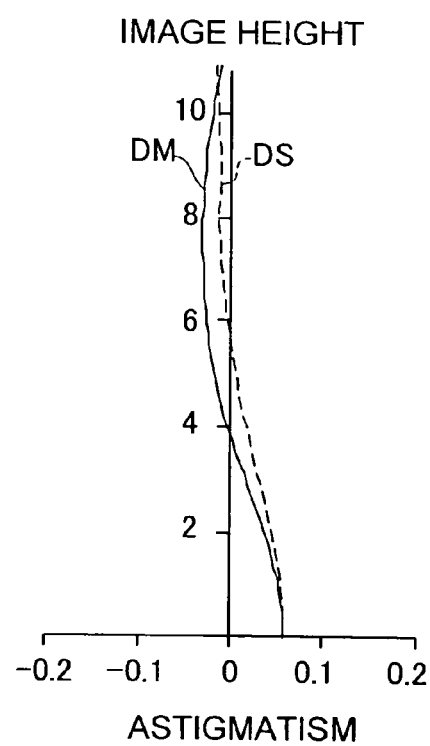
Figure 8C:
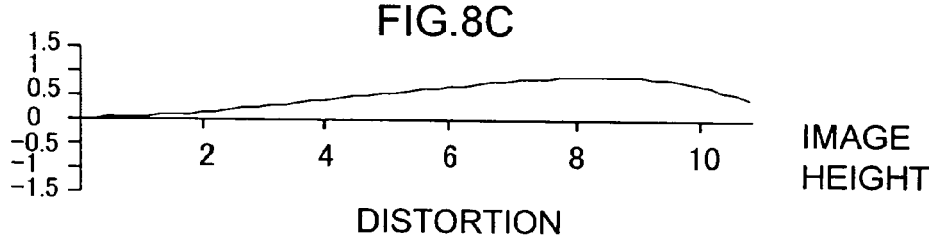
Figure 8D:
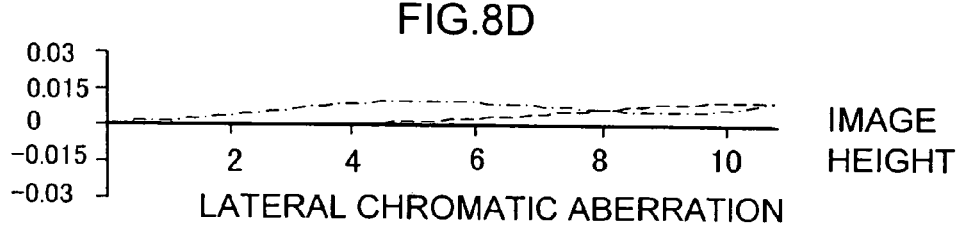

FIG. 7 is an explanatory view showing the schematic structure of a projecting apparatus according to the present embodiment. In the projecting apparatus of the present embodiment, in the projection optical system 1 of the first embodiment, the lens element L16 and the lens element L17 of the third lens unit G13 are not cemented together, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a fourth example.

FOURTH EXAMPLE

Table 10 shows the construction data of the projection optical system 1 according to the present example. In the present example, the F number is 2.5, the angle of view (2ω) is 92.0 degrees, the overall focal length FL of the projection optical system 1 is 10.44 mm, and the projection distance is 589 mm.

TABLE 10

| S | CR | T | Nd | Vd |
|---|---|---|---|---|
| 1 | 70.2302 | 3.5000 | 1.6230 | 58.10 |
| 2 | 41.0896 | 15.9878 | 1.0000 | |
| 3 | 84.6628 | 2.6000 | 1.6584 | 50.90 |
| 4 | 31.6285 | 8.7530 | 1.0000 | |
| 5 | 41.3329 | 3.5000 | 1.5305 | 55.72 |
| 6 | 18.0126 | 99.0000 | 1.0000 | |
| 7 | 134.3900 | 4.4316 | 1.7859 | 43.90 |
| 8 | −178.5200 | 12.1133 | 1.0000 | |
| 9 | 39.6894 | 3.5603 | 1.7130 | 53.90 |
| 10 | 93.6416 | 21.5511 | 1.0000 | |
| 11 | APR | 0.8331 | | |
| 12 | −184.3760 | 1.0000 | 1.8061 | 33.30 |
| 13 | 27.2420 | 0.4000 | 1.0000 | |
| 14 | 39.9182 | 2.4054 | 1.4875 | 70.40 |
| 15 | −73.9432 | 24.6519 | 1.0000 | |
| 16 | 151.3190 | 1.2000 | 1.8061 | 33.30 |
| 17 | 26.0306 | 8.0447 | 1.4875 | 70.40 |
| 18 | −48.9676 | 0.2000 | 1.0000 | |
| 19 | 34.1181 | 8.4513 | 1.4970 | 81.20 |
| 20 | −48.5971 | 4.8284 | 1.0000 | |
| 21 | INF | 24.0000 | 1.5168 | 64.20 |
| 22 | INF | 3.5000 | 1.0000 | |
| 23 | INF | 3.0000 | 1.5085 | 61.19 |
| 24 | INF | 0.5000 | 1.0000 | |

The definitions of S, T, Nd and Vd in Table 10 are similar to those of the first example. In the present example, the surface numbers 1 to 24 in Table 10 correspond to S1 to S24 (the reflecting surface of the mirror B1 is excluded) in FIG. 7. Moreover, in the present example, the sixth surface is aspherical. The aspherical coefficients of the sixth surface are as shown in Table 11. In Table 11, $E-n = \times 10^{-n}$.

TABLE 11

| S | k | $A_4$ | $A_6$ | $A_8$ |
|---|---|---|---|---|
| 6 | −0.93299 | −5.21374E−06 | −1.12467E−09 | −4.67730E−12 |

FIGS. 8A to 8D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 12.

TABLE 12

| | condition (1) | condition (2) | condition (3) | condition (4) |
|---|---|---|---|---|
| fourth example | 9.48 | 4.89 | 2.34 | 2.55 |

Since the values shown in Table 12 all fulfill the conditions (1) to (4), it can be said that the above-mentioned effects by the definitions of the conditions are obtained. Further, since the values shown in Table 12 also fulfill the conditions (1') to (4'), it can be said that the effects are surely obtained.

Fifth Embodiment

A fifth embodiment of the present invention will be described with reference to the drawings as follows. The same structures as those of the first to fourth embodiments are denoted by the same reference numerals, and descriptions thereof are omitted.

Figure 9:
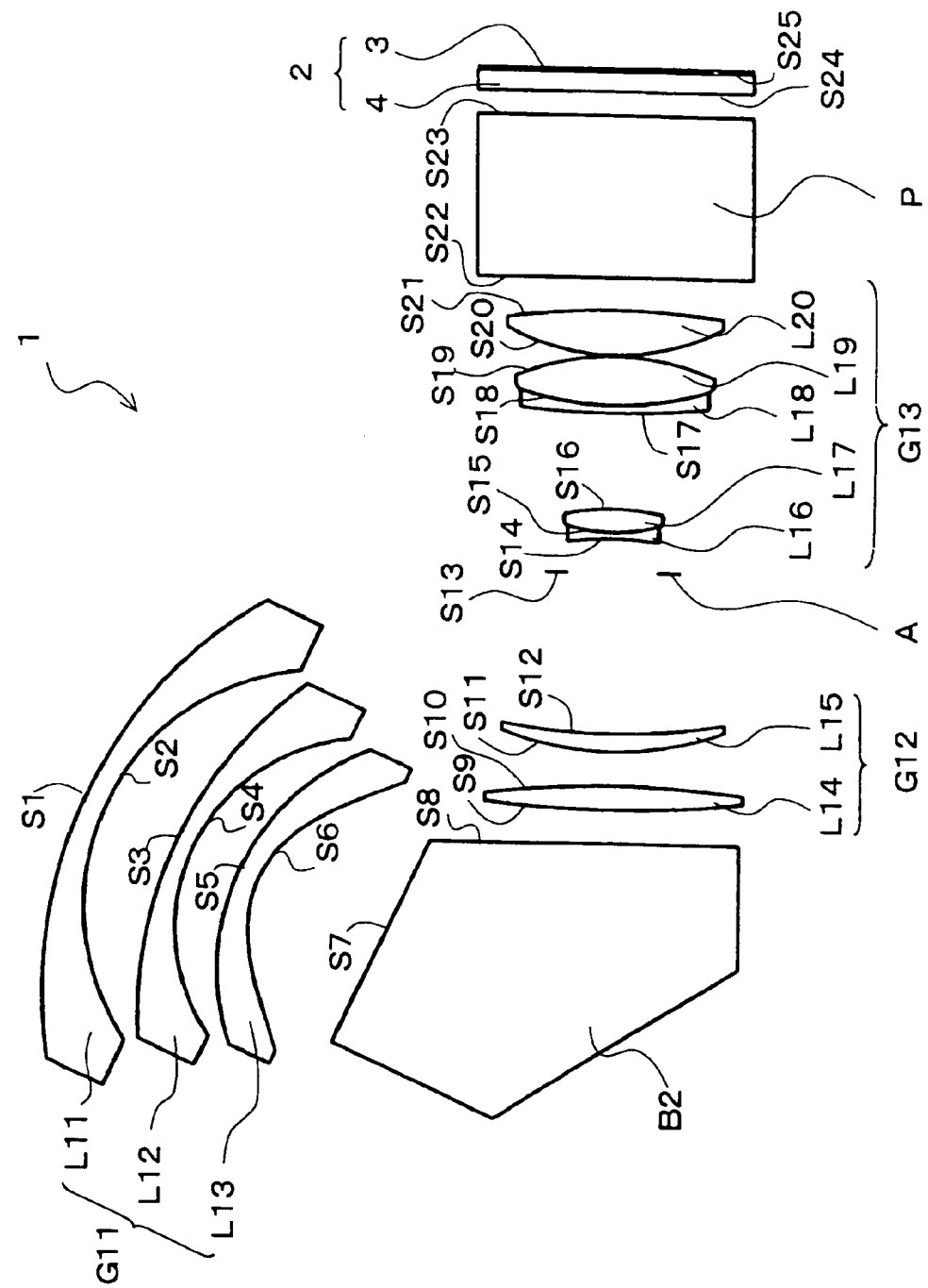
FIG. 9 is an explanatory view showing the schematic structure of a projecting apparatus according to a fifth embodiment of the present invention.
Figure 10A:
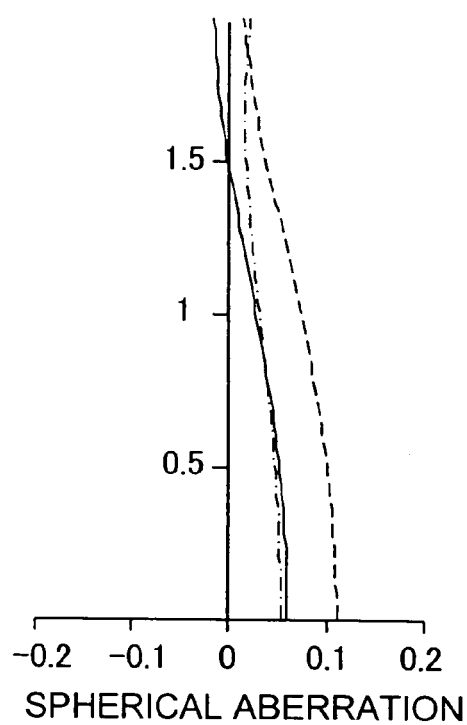
FIGS. 10A to 10D are explanatory views showing aberrations of the fifth embodiment of the present invention.
Figure 10B:
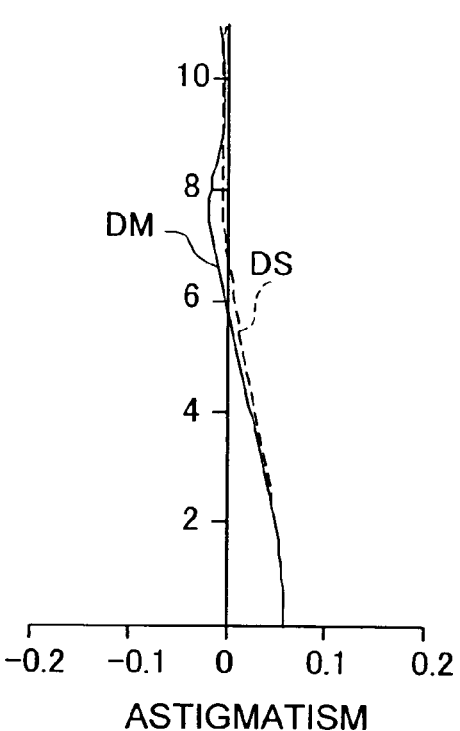
Figure 10C:
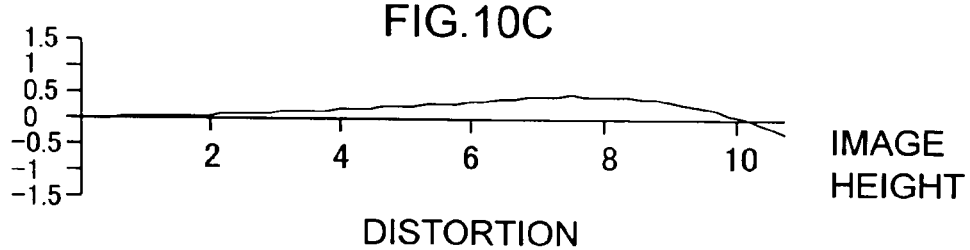
Figure 10D:
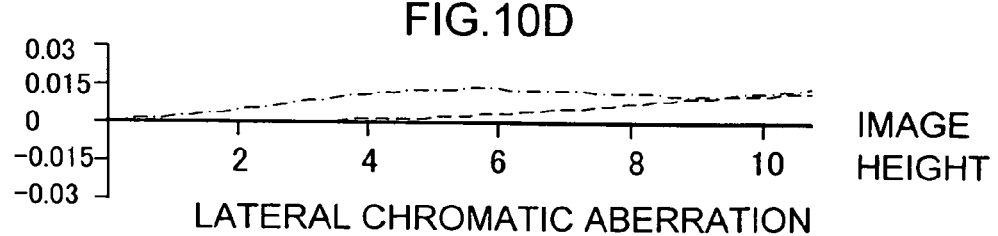

FIG. 9 is an explanatory view showing the schematic structure of a projecting apparatus according to the present embodiment. In the projecting apparatus of the present embodiment, in the projection optical system 1 of the first embodiment, the mirror B1 is replaced with the prism B2, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a fifth example.

FIFTH EXAMPLE

Table 13 shows the construction data of the projection optical system 1 according to the present example. In the present example, the F number is 2.5, the angle of view (2ω) is 92.0 degrees, the overall focal length FL of the projection optical system 1 is 10.44 mm, and the projection distance is 595 mm.

TABLE 13

| S | CR | T | Nd | Vd |
|---|---|---|---|---|
| 1 | 68.8151 | 3.2000 | 1.6031 | 60.70 |
| 2 | 35.9230 | 11.6172 | 1.0000 | |
| 3 | 62.2452 | 2.5000 | 1.7130 | 53.90 |
| 4 | 28.6619 | 7.4286 | 1.0000 | |
| 5 | 35.7256 | 3.0000 | 1.5305 | 55.72 |
| 6 | 16.4987 | 20.0000 | 1.0000 | |
| 7 | INF | 67.0000 | 1.5168 | 64.20 |
| 8 | INF | 5.0000 | 1.0000 | |
| 9 | 152.2230 | 3.5685 | 1.7859 | 43.90 |
| 10 | −148.4340 | 5.0892 | 1.0000 | |
| 11 | 43.4957 | 2.7140 | 1.8340 | 37.30 |
| 12 | 87.8835 | 24.1614 | 1.0000 | |
| 13 | APR | 5.1249 | 1.0000 | |
| 14 | −50.7238 | 1.0000 | 1.8061 | 33.30 |
| 15 | 23.5256 | 3.5205 | 1.4875 | 70.40 |
| 16 | −34.5179 | 14.5594 | 1.0000 | |
| 17 | 114.8400 | 1.2000 | 1.8061 | 33.30 |
| 18 | 41.7463 | 7.3874 | 1.4875 | 70.40 |
| 19 | −35.8314 | 0.2000 | 1.0000 | |
| 20 | 32.1309 | 6.7326 | 1.4970 | 81.20 |
| 21 | −112.8740 | 4.8359 | 1.0000 | |
| 22 | INF | 24.0000 | 1.5168 | 64.20 |
| 23 | INF | 3.5000 | 1.0000 | |
| 24 | INF | 3.0000 | 1.5085 | 61.19 |
| 25 | INF | 0.5000 | 1.0000 | |

The definitions of S, T, Nd and Vd in Table 13 are similar to those of the first example. In the present example, the surface numbers 1 to 25 in Table 13 correspond to S1 to S25 (the reflecting surface of the prism B2 is excluded) in FIG. 9. Moreover, S7 and S8 represent the light exit surface and the light incident surface of the prism B2. Moreover, in the present example, the fifth and sixth surfaces, that is, the enlargement side and reduction side surfaces of the lens element L13 are aspherical. The aspherical coefficients of the fifth and sixth surfaces are as shown in Table 14. In Table 14, $E-n = \times 10^{-n}$.

TABLE 14

| S | k | $A_4$ | $A_6$ | $A_8$ | $A_{10}$ |
|---|---|---|---|---|---|
| 5 | 0.00000 | 1.24443E−06 | −1.18220E−09 | −3.67403E−12 | 4.80843E−15 |
| 6 | −0.87734 | −5.43743E−06 | −8.54385E−09 | −1.04337E−11 | 8.11728E−15 |

FIGS. 10A to 10D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 15.

TABLE 15

|  | condition (1) | condition (2) | condition (3) | condition (4) |
|---|---|---|---|---|
| fifth example | 6.62 | 4.79 | 2.20 | 2.55 |

Since the values shown in Table 15 all fulfill the conditions (1) to (4), it can be said that the above-mentioned effects by the definitions of the conditions are obtained. Further, since the values shown in Table 15 also fulfill the conditions (1') to (4'), it can be said that the effects are surely obtained.

Sixth Embodiment

A sixth embodiment of the present invention will be described with reference to the drawings as follows. The same structures as those of the first to fifth embodiments are denoted by the same reference numerals, and descriptions thereof are omitted.

Figure 11:
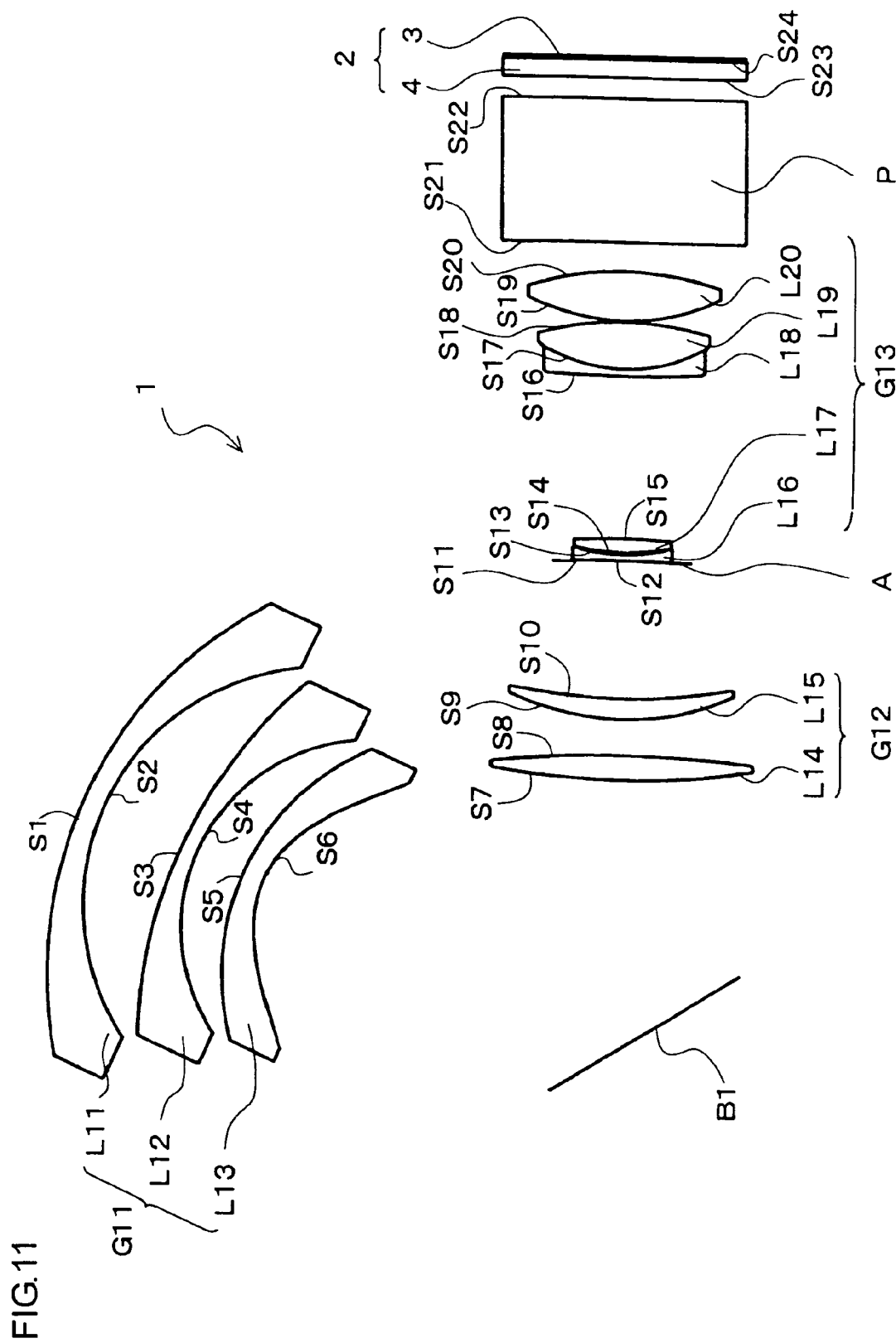
FIG. 11 is an explanatory view showing the schematic structure of a projecting apparatus according to a sixth embodiment of the present invention.

FIG. 11 is an explanatory view showing the schematic structure of a projecting apparatus according to the present embodiment. In the projecting apparatus of the present embodiment, in the projection optical system 1 of the first embodiment, the lens element L16 and the lens element L17 of the third lens unit G13 are not cemented together, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a sixth example.

SIXTH EXAMPLE

Table 16 shows the construction data of the projection optical system 1 according to the present example. In the present example, the F number is 2.5, the angle of view (2ω) is 92.0 degrees, the overall focal length FL of the projection optical system 1 is 10.44 mm, and the projection distance is 589 mm.

TABLE 16

| S | CR | T | Nd | Vd |
|---|---|---|---|---|
| 1 | 71.9726 | 3.5000 | 1.6230 | 58.10 |
| 2 | 40.8718 | 14.4611 | 1.0000 | |
| 3 | 81.8907 | 2.6000 | 1.6584 | 50.90 |
| 4 | 32.2442 | 8.4080 | 1.0000 | |
| 5 | 41.8584 | 3.5000 | 1.5305 | 55.72 |
| 6 | 18.4308 | 110.0000 | 1.0000 | |
| 7 | 124.3800 | 4.1840 | 1.7859 | 43.90 |
| 8 | −200.2460 | 6.0929 | 1.0000 | |
| 9 | 41.5081 | 3.5495 | 1.7130 | 53.90 |
| 10 | 89.2035 | 23.3797 | 1.0000 | |
| 11 | APR | 0.1693 | 1.0000 | |
| 12 | −422.1220 | 1.0000 | 1.8061 | 33.30 |
| 13 | 26.5122 | 0.4000 | 1.0000 | |
| 14 | 35.4377 | 2.5143 | 1.4875 | 70.40 |
| 15 | −94.2343 | 27.6287 | 1.0000 | |
| 16 | 190.4740 | 1.2000 | 1.8061 | 33.30 |
| 17 | 25.9367 | 7.9998 | 1.4875 | 70.40 |
| 18 | −50.6901 | 0.2000 | 1.0000 | |
| 19 | 33.9322 | 8.3744 | 1.4970 | 81.20 |
| 20 | −49.3424 | 4.8284 | 1.0000 | |
| 21 | INF | 24.0000 | 1.5168 | 64.20 |
| 22 | INF | 3.5000 | 1.0000 | |
| 23 | INF | 3.0000 | 1.5085 | 61.19 |
| 24 | INF | 0.5000 | 1.0000 | |

The definitions of S, T, Nd and Vd in Table 16 are similar to those of the first example. In the present example, the surface numbers 1 to 24 in Table 16 correspond to S1 to S24 (the reflecting surface of the mirror B1 is excluded) in FIG. 11. Moreover, in the present example, the sixth surface is aspherical. The aspherical coefficients of the sixth surface are as shown in Table 17. In Table 17, E−n=×10$^{-n}$.

TABLE 17

| S | k | $A_4$ | $A_6$ | $A_8$ |
|---|---|---|---|---|
| 6 | −0.93112 | −4.62660E−06 | −1.14156E−09 | −4.24318E−12 |

FIGS. 12A to 12D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 18.

TABLE 18

|  | condition (1) | condition (2) | condition (3) | condition (4) |
|---|---|---|---|---|
| sixth example | 10.54 | 4.99 | 2.42 | 2.55 |

Since the values shown in Table 18 all fulfill the conditions (1) to (4), it can be said that the above-mentioned effects by the definitions of the conditions are obtained. Further, since the values shown in Table 18 also fulfill the conditions (1') to (4'), it can be said that the effects are surely obtained.

Seventh Embodiment

A seventh embodiment of the present invention will be described with reference to the drawings as follows. The same structures as those of the first to sixth embodiments are denoted by the same reference numerals, and descriptions thereof are omitted.

Figure 13:
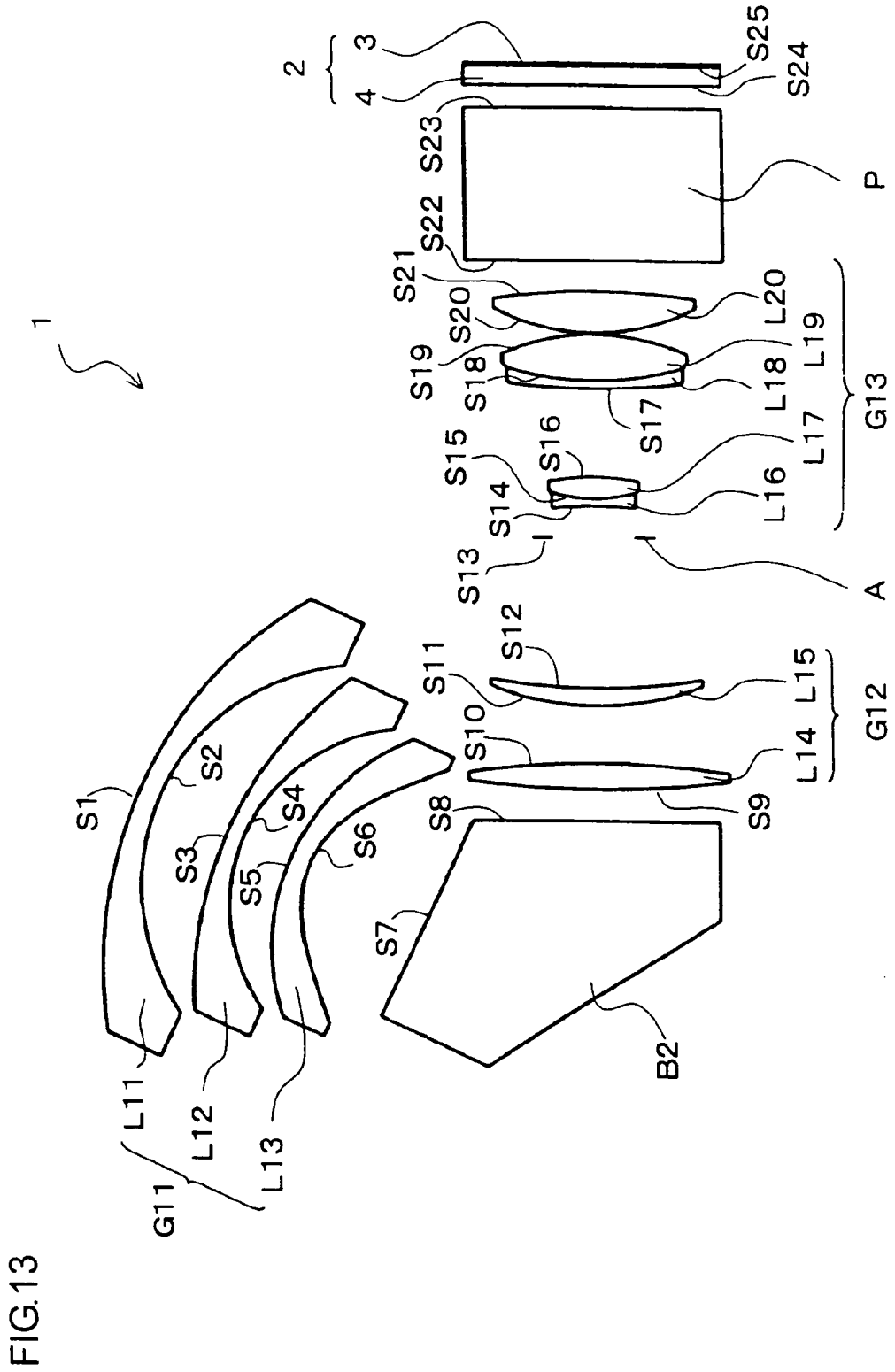
FIG. 13 is an explanatory view showing the schematic structure of a projecting apparatus according to a seventh embodiment of the present invention.
Figure 14A:
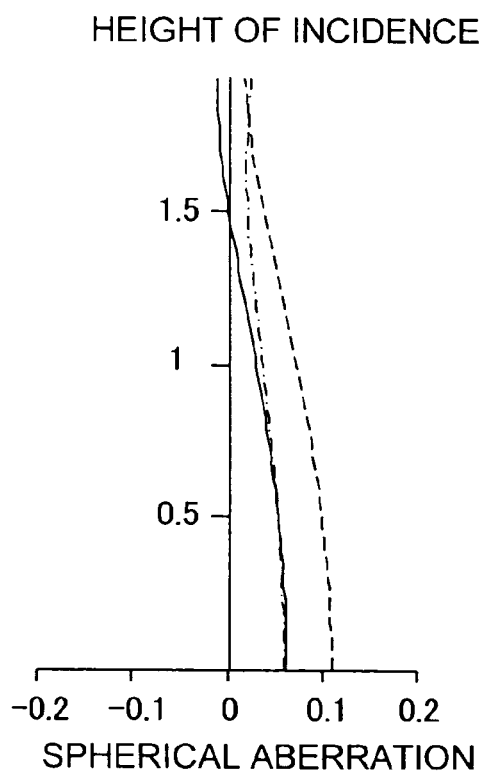
FIGS. 14A to 14D are explanatory views showing aberrations of the seventh embodiment of the present invention.
Figure 14B:
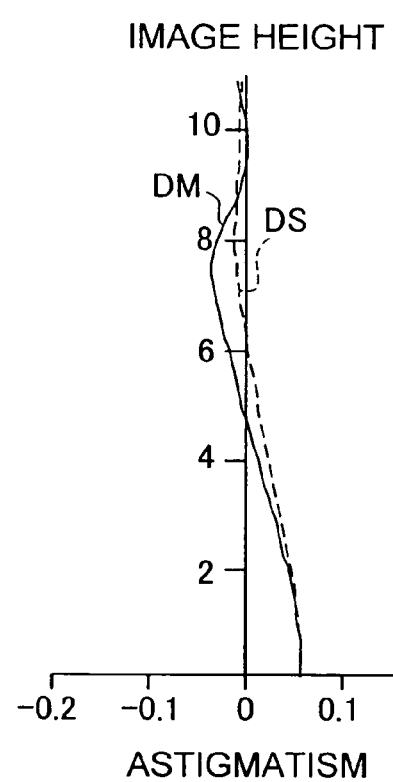
Figure 14C:
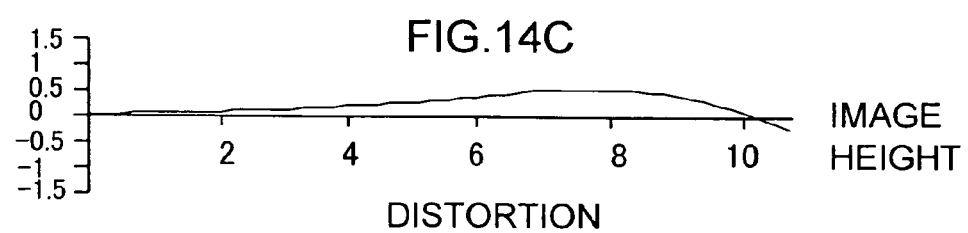
Figure 14D:
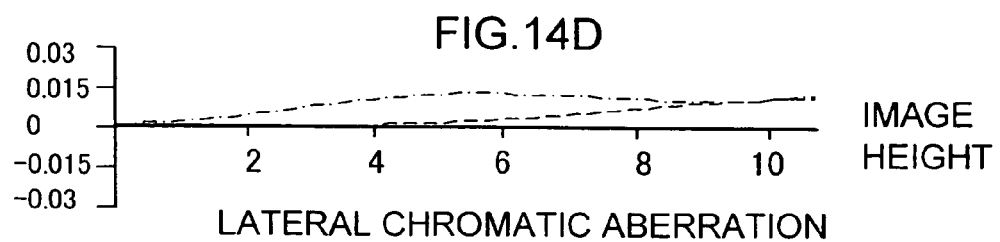
Figure 16A:
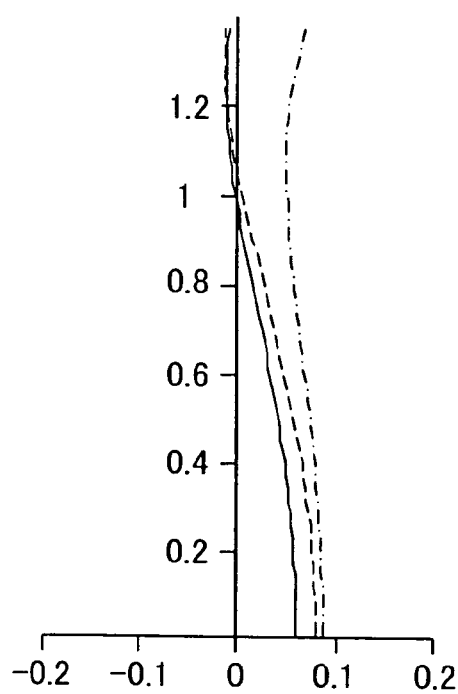
FIGS. 16A to 16D are explanatory views showing aberrations of the eighth embodiment of the present invention.
Figure 16B:
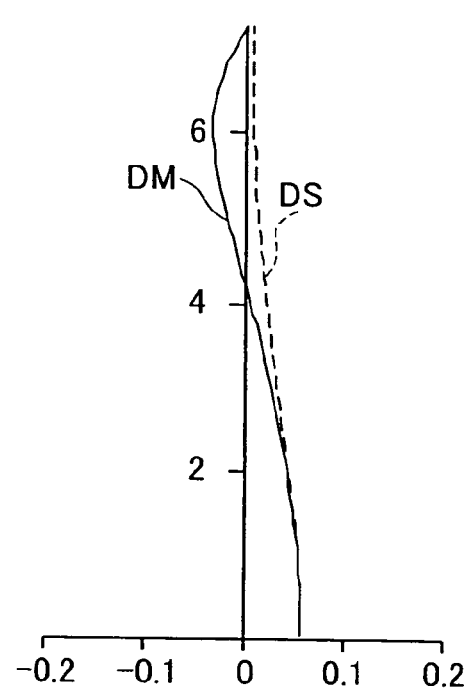
Figure 16C:
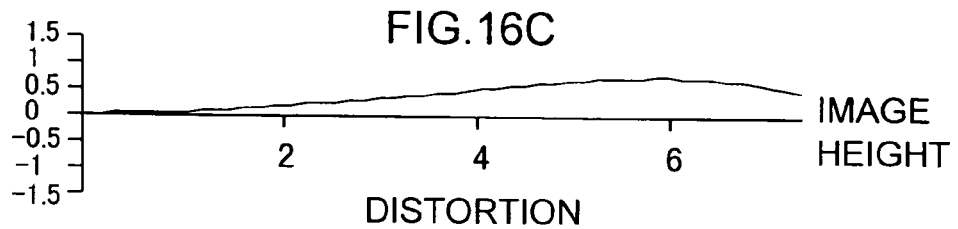
Figure 16D:
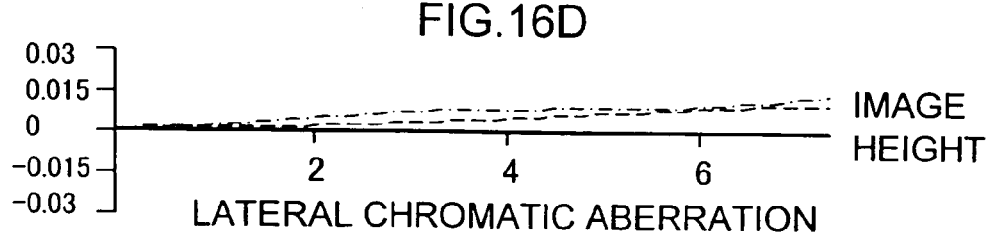
Figure 18A:
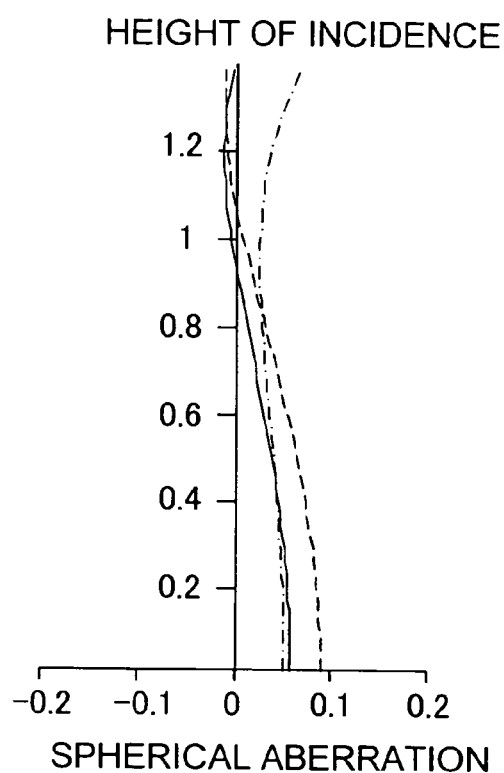
FIGS. 18A to 18D are explanatory views showing aberrations of the ninth embodiment of the present invention.
Figure 18B:
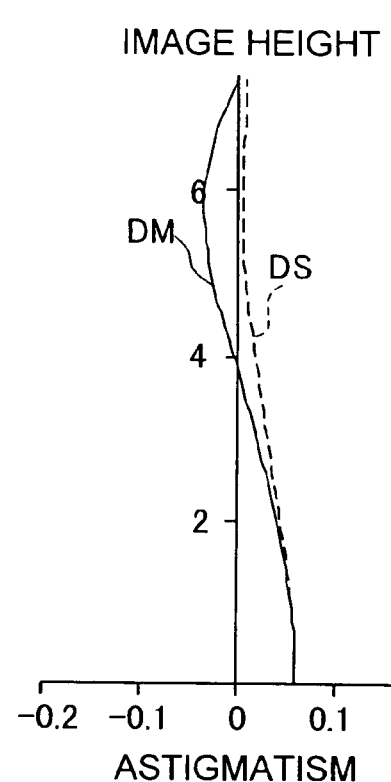
Figure 18C:
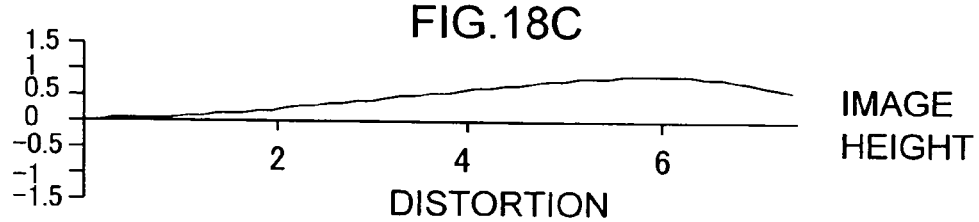
Figure 18D:
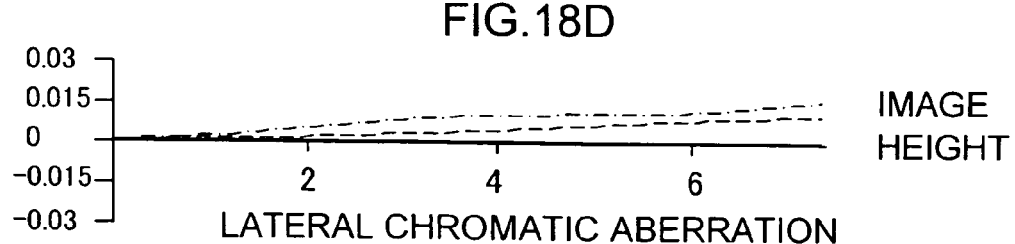

FIG. 13 is an explanatory view showing the schematic structure of a projecting apparatus according to the present embodiment. In the projecting apparatus of the present embodiment, in the projection optical system 1 of the first embodiment, the mirror B1 is replaced with the prism B2, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a seventh example.

SEVENTH EXAMPLE

Table 19 shows the construction data of the projection optical system 1 according to the present example. In the present example, the F number is 2.5, the angle of view (2ω) is 92.0 degrees, the overall focal length FL of the projection optical system 1 is 10.44 mm, and the projection distance is 595 mm.

The definitions of S, T, Nd and Vd in Table 19 are similar to those of the first example. In the present example, the surface numbers 1 to 25 in Table 19 correspond to S1 to S25 (the reflecting surface of the mirror B1 is excluded) in FIG. 13. Moreover, S7 and S8 represent the light exit surface and the light incident surface of the prism B2. Moreover, in the present example, the fifth and sixth surfaces are aspherical. The aspherical coefficients of the fifth and sixth surfaces are as shown in Table 20. In Table 20, $E-n = \times 10^{-n}$.

TABLE 20

| S | k | $A_4$ | $A_6$ | $A_8$ | $A_{10}$ |
|---|---|---|---|---|---|
| 5 | 0.00000 | 1.56092E-06 | -1.07252E-09 | -5.30660E-12 | 7.06521E-15 |
| 6 | -0.88586 | -5.72028E-06 | -9.47631E-09 | -1.03887E-11 | 1.03152E-14 |

FIGS. 14A to 14D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 21.

TABLE 21

|  | condition (1) | condition (2) | condition (3) | condition (4) |
|---|---|---|---|---|
| seventh example | 5.99 | 4.78 | 2.12 | 2.55 |

Since the values shown in Table 21 all fulfill the conditions (1) to (4), it can be said that the above-mentioned effects by the definitions of the conditions are obtained. Further, since the values shown in Table 21 also fulfill the conditions (1') to (4'), it can be said that the effects are surely obtained.

Eighth Embodiment

An eighth embodiment of the present invention will be described with reference to the drawings as follows. The same structures as those of the first to seventh embodiments are denoted by the same reference numerals, and descriptions thereof are omitted.

FIG. 15 is an explanatory view showing the schematic structure of a projecting apparatus according to the present embodiment. In the projecting apparatus of the present embodiment, in the projection optical system 1 of the first embodiment, a lens element L21 having positive optical power is further provided on the reduction side of the lens element L20 of the third lens unit G13, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as an eighth example.

EIGHTH EXAMPLE

Table 22 shows the construction data of the projection optical system 1 according to the present example. In the

TABLE 19

| S | CR | T | Nd | Vd |
|---|---|---|---|---|
| 1 | 69.5246 | 3.2000 | 1.6031 | 60.70 |
| 2 | 35.8600 | 11.8319 | 1.0000 |  |
| 3 | 62.9462 | 2.5000 | 1.7130 | 53.90 |
| 4 | 28.5592 | 7.7743 | 1.0000 |  |
| 5 | 36.5579 | 3.0000 | 1.5305 | 55.72 |
| 6 | 16.2600 | 20.0000 | 1.0000 |  |
| 7 | INF | 57.0000 | 1.5168 | 64.20 |
| 8 | INF | 5.0000 | 1.0000 |  |
| 9 | 147.4000 | 4.1188 | 1.7859 | 43.90 |
| 10 | -141.4230 | 9.1913 | 1.0000 |  |
| 11 | 43.5470 | 2.8061 | 1.8340 | 37.30 |
| 12 | 89.1265 | 24.2016 | 1.0000 |  |
| 13 | APR | 5.1237 | 1.0000 |  |
| 14 | -50.4055 | 1.0000 | 1.8061 | 33.30 |
| 15 | 22.3286 | 3.5343 | 1.4875 | 70.40 |
| 16 | -34.0753 | 14.1839 | 1.0000 |  |
| 17 | 111.4680 | 1.2000 | 1.8061 | 33.30 |
| 18 | 44.3428 | 7.3986 | 1.4875 | 70.40 |
| 19 | -34.4194 | 0.2000 | 1.0000 |  |
| 20 | 32.8943 | 6.7040 | 1.4970 | 81.20 |
| 21 | -104.9290 | 4.8367 | 1.0000 |  |
| 22 | INF | 24.0000 | 1.5168 | 64.20 |
| 23 | INF | 3.5000 | 1.0000 |  |
| 24 | INF | 3.0000 | 1.5085 | 61.19 |
| 25 | INF | 0.5000 | 1.0000 |  | present example, the F number is 2.5, the angle of view (2ω) is 90.0 degrees, the overall focal length FL of the projection optical system 1 is 7.14 mm, and the projection distance is 699 mm.

TABLE 22

| S | CR | T | Nd | Vd |
|---|---|---|---|---|
| 1 | 47.3104 | 2.3000 | 1.6230 | 58.10 |
| 2 | 24.9590 | 8.1185 | 1.0000 | |
| 3 | 40.7990 | 1.7000 | 1.6584 | 50.90 |
| 4 | 19.9337 | 7.0755 | 1.0000 | |
| 5 | 26.3703 | 2.5000 | 1.5305 | 55.72 |
| 6 | 11.9003 | 58.3771 | 1.0000 | |
| 7 | 96.4767 | 2.0667 | 1.7552 | 27.50 |
| 8 | −270.3800 | 0.2100 | 1.0000 | |
| 9 | 29.7091 | 3.4743 | 1.5814 | 40.90 |
| 10 | 876.7240 | 12.8879 | 1.0000 | |
| 11 | APR | 2.5627 | 1.0000 | |
| 12 | −33.4387 | 1.0000 | 1.8061 | 33.30 |
| 13 | 17.9191 | 3.1606 | 1.4875 | 70.40 |
| 14 | −24.2685 | 12.5915 | 1.0000 | |
| 15 | −134.9980 | 1.0000 | 1.8061 | 33.30 |
| 16 | 26.1054 | 5.9772 | 1.4875 | 70.40 |
| 17 | −26.6334 | 0.2000 | 1.0000 | |
| 18 | 32.6139 | 4.3393 | 1.4875 | 70.40 |
| 19 | −82.5484 | 0.2000 | 1.0000 | |
| 20 | 78.6429 | 3.4330 | 1.4970 | 81.20 |
| 21 | −50.6129 | 2.0083 | 1.0000 | |
| 22 | INF | 21.4100 | 1.5168 | 64.20 |
| 23 | INF | 3.5000 | 1.0000 | |
| 24 | INF | 3.0000 | 1.5085 | 61.19 |
| 25 | INF | 0.5000 | 1.0000 | |

The definitions of S, T, Nd and Vd in Table 22 are similar to those of the first example. In the present example, the surface numbers 1 to 25 in Table 22 correspond to S1 to S25 (the reflecting surface of the mirror B1 is excluded) in FIG. 15. Moreover, in the present example, the sixth surface is aspherical. The aspherical coefficients of the sixth surface are as shown in Table 23. In Table 23, E-n=×10$^{-n}$.

TABLE 23

| S | k | $A_4$ | $A_6$ | $A_8$ |
|---|---|---|---|---|
| 6 | −0.90018 | −1.77889E−05 | −2.93396E−08 | −9.57305E−11 |

FIGS. 16A to 16D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 24.

TABLE 24

| | condition (1) | condition (2) | condition (3) | condition (4) |
|---|---|---|---|---|
| eighth example | 8.17 | 4.74 | 2.31 | 3.10 |

Since the values shown in Table 24 all fulfill the conditions (1) to (4), it can be said that the above-mentioned effects by the definitions of the conditions are obtained. Further, since the values shown in Table 24 also fulfill the conditions (1') to (4'), it can be said that the effects are surely obtained.

Ninth Embodiment

A ninth embodiment of the present invention will be described with reference to the drawings as follows. The same structures as those of the first to eighth embodiments are denoted by the same reference numerals, and descriptions thereof are omitted.

FIG. 17 is an explanatory view showing the schematic structure of a projecting apparatus according to the present embodiment. In the projecting apparatus of the present embodiment, in the projection optical system 1 of the first embodiment, the lens element L16 and the lens element L17 of the third lens unit G13 are not cemented together, the lens element L21 having positive optical power is further provided on the reduction side of the lens element L20, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a ninth example.

NINTH EXAMPLE

Table 25 shows the construction data of the projection optical system 1 according to the present example. In the present example, the F number is 3.5, the angle of view (2ω) is 90.0 degrees, the overall focal length FL of the projection optical system 1 is 7.14 mm, and the projection distance is 699 mm.

TABLE 25

| S | CR | T | Nd | Vd |
|---|---|---|---|---|
| 1 | 48.4482 | 2.3000 | 1.6230 | 58.10 |
| 2 | 24.8647 | 7.8107 | 1.0000 | |
| 3 | 39.2802 | 1.7000 | 1.6584 | 50.90 |
| 4 | 20.0139 | 6.5493 | 1.0000 | |
| 5 | 25.6996 | 2.5000 | 1.5305 | 55.72 |
| 6 | 11.8920 | 58.0282 | 1.0000 | |
| 7 | 88.4180 | 2.4184 | 1.7552 | 27.50 |
| 8 | −117.8690 | 0.6847 | 1.0000 | |
| 9 | 31.2300 | 2.4112 | 1.5814 | 40.90 |
| 10 | 123.1350 | 12.7398 | 1.0000 | |
| 11 | APR | 0.5901 | 1.0000 | |
| 12 | −27.6918 | 1.0000 | 1.8061 | 33.30 |
| 13 | 29.6722 | 0.2500 | 1.0000 | |
| 14 | 41.3196 | 2.9504 | 1.4875 | 70.40 |
| 15 | −17.8513 | 15.1824 | 1.0000 | |
| 16 | −132.4550 | 1.0000 | 1.8061 | 33.30 |
| 17 | 22.3135 | 6.1843 | 1.4875 | 70.40 |
| 18 | −27.4063 | 0.2000 | 1.0000 | |
| 19 | 30.4105 | 3.8739 | 1.4875 | 70.40 |
| 20 | −222.2240 | 0.2000 | 1.0000 | |
| 21 | 80.8975 | 3.7130 | 1.4970 | 81.20 |
| 22 | −40.6357 | 2.0082 | 1.0000 | |
| 23 | INF | 21.4100 | 1.5168 | 64.20 |
| 24 | INF | 3.5000 | 1.0000 | |
| 25 | INF | 3.0000 | 1.5085 | 61.19 |
| 26 | INF | 0.5000 | 1.0000 | |

The definitions of S, T, Nd and Vd in Table 25 are similar to those of the first example. In the present example, the surface numbers 1 to 26 in Table 25 correspond to S1 to S26 (the reflecting surface of the mirror B1 is excluded) in FIG. 17. Moreover, in the present example, the sixth surface is aspherical. The aspherical coefficients of the sixth surface are as shown in Table 26. In Table 26, E-n=×10$^{-n}$.

TABLE 26

| S | k | $A_4$ | $A_6$ | $A_8$ |
|---|---|---|---|---|
| 6 | −0.88976 | −1.71150E-05 | −2.42336E-08 | −1.11192E-10 |

FIGS. 18A to 18D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 27.

TABLE 27

|  | condition (1) | condition (2) | condition (3) | condition (4) |
|---|---|---|---|---|
| ninth example | 8.12 | 4.87 | 2.37 | 3.10 |

Since the values shown in Table 27 all fulfill the conditions (1) to (4), it can be said that the above-mentioned effects by the definitions of the conditions are obtained. Further, since the values shown in Table 27 also fulfill the conditions (1') to (4'), it can be said that the effects are surely obtained.

Tenth Embodiment

A tenth embodiment of the present invention will be described with reference to the drawings as follows. The same structures as those of the first to ninth embodiments are denoted by the same reference numerals, and descriptions thereof are omitted.

Figure 19:
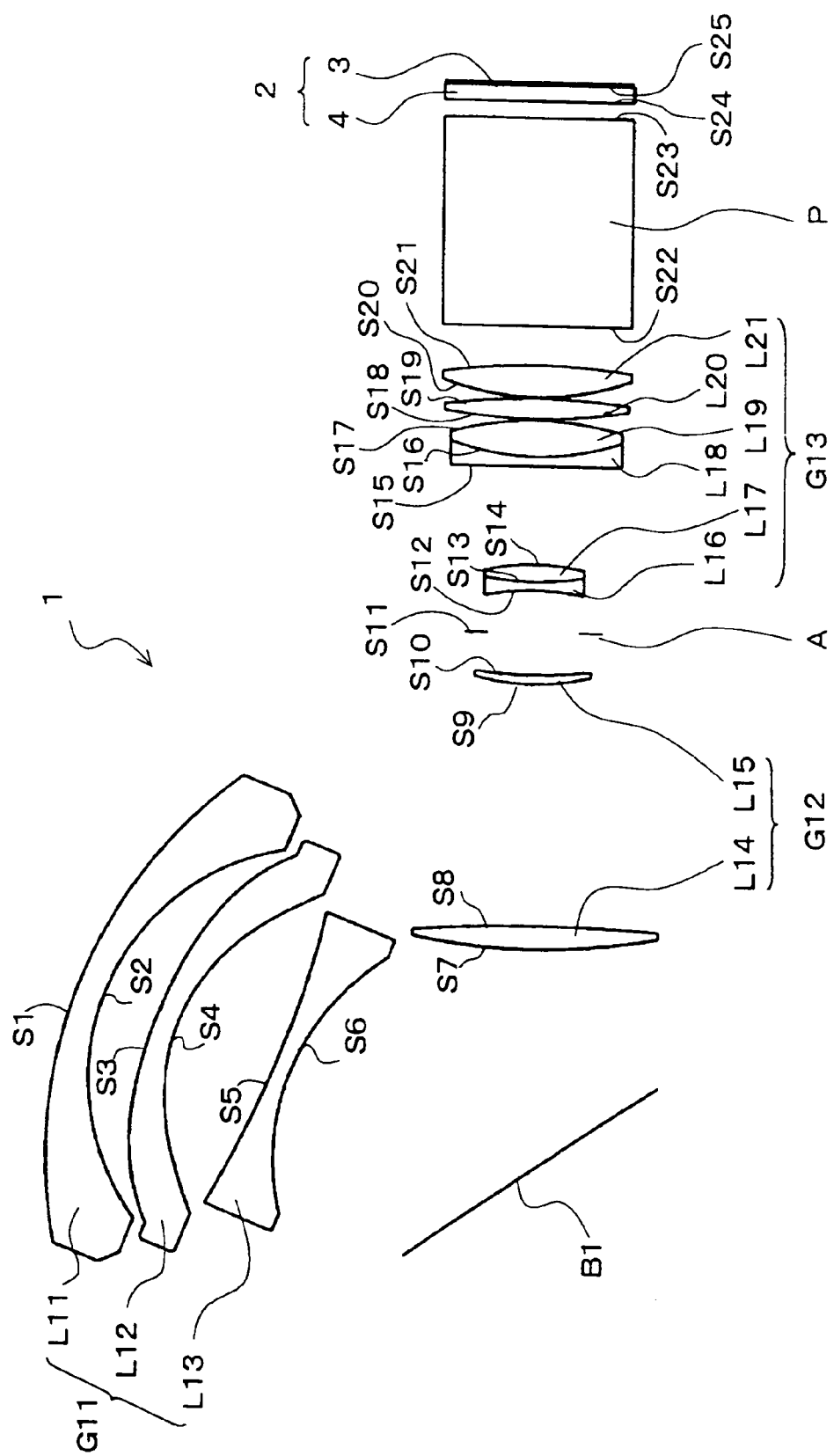
FIG. 19 is an explanatory view showing the schematic structure of a projecting apparatus according to a tenth embodiment of the present invention.
Figure 20A:
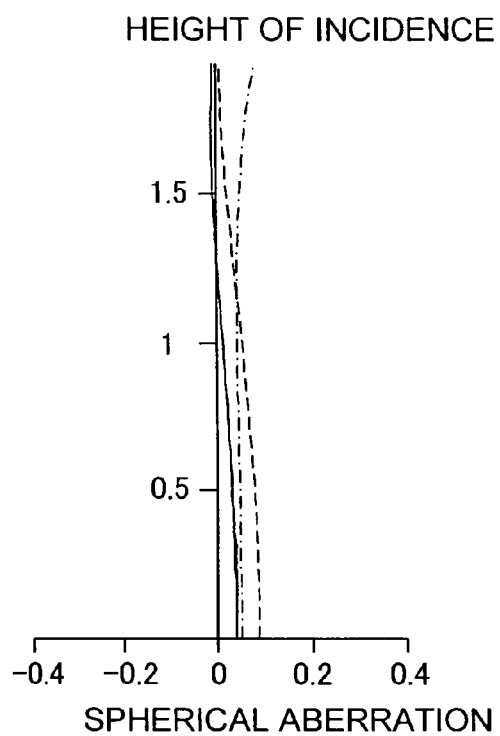
FIGS. 20A to 20D are explanatory views showing aberrations of the tenth embodiment of the present invention.
Figure 20B:
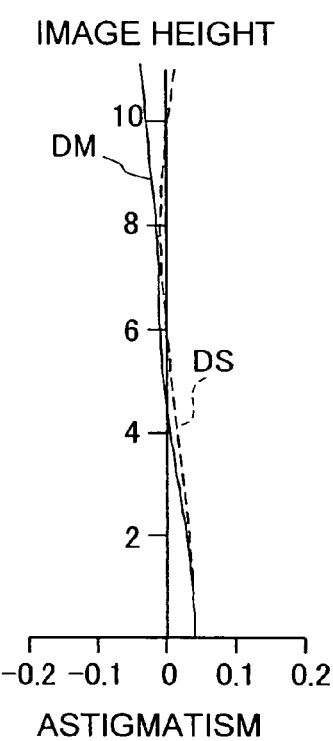
Figure 20C:
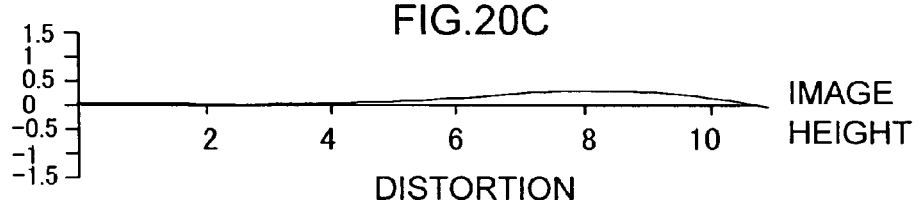
Figure 20D:
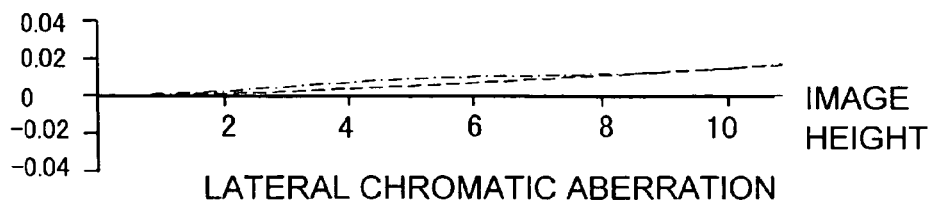

FIG. 19 is an explanatory view showing the schematic structure of a projecting apparatus according to the present embodiment. In the projecting apparatus of the present embodiment, in the projection optical system 1 of the first embodiment, the lens element L21 having positive optical power is further provided on the reduction side of the lens element L20 of the third lens unit G13, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a tenth example.

TENTH EXAMPLE

Table 28 shows the construction data of the projection optical system 1 according to the present example. In the present example, the F number is 2.5, the angle of view (2ω) is 92.5 degrees, the overall focal length FL of the projection optical system 1 is 10.25 mm, and the projection distance is 683 mm.

TABLE 28

| S | CR | T | Nd | Vd |
|---|---|---|---|---|
| 1 | 85.9632 | 5.0000 | 1.5891 | 61.25 |
| 2 | 43.0787 | 10.4280 | 1.0000 |  |
| 3 | 92.6295 | 4.0000 | 1.5305 | 55.72 |
| 4 | 35.1836 | 19.2246 | 1.0000 |  |
| 5 | −183.4990 | 2.9000 | 1.5891 | 61.25 |
| 6 | 44.3290 | 87.9838 | 1.0000 |  |
| 7 | 112.5530 | 4.3393 | 1.8061 | 40.72 |
| 8 | −296.1790 | 44.1009 | 1.0000 |  |
| 9 | 42.8818 | 1.6839 | 1.7283 | 28.32 |
| 10 | 79.9744 | 7.8006 | 1.0000 |  |
| 11 | APR | 7.8170 | 1.0000 |  |
| 12 | −44.9703 | 1.4916 | 1.8061 | 33.27 |
| 13 | 49.1158 | 3.2334 | 1.4875 | 70.44 |
| 14 | −40.7475 | 18.0791 | 1.0000 |  |
| 15 | 8009.6200 | 1.7962 | 1.8061 | 33.27 |
| 16 | 46.7178 | 6.6500 | 1.4875 | 70.44 |
| 17 | −54.6184 | 0.3000 | 1.0000 |  |
| 18 | 103.5120 | 3.7037 | 1.4875 | 70.44 |
| 19 | −119.3080 | 0.2000 | 1.0000 |  |
| 20 | 48.8057 | 5.8737 | 1.4875 | 70.44 |
| 21 | −111.8290 | 7.1000 | 1.0000 |  |
| 22 | INF | 38.0000 | 1.6074 | 56.71 |
| 23 | INF | 3.0000 | 1.0000 |  |
| 24 | INF | 3.0000 | 1.5085 | 61.19 |
| 25 | INF | 0.5000 | 1.0000 |  |

The definitions of S, T, Nd and Vd in Table 28 are similar to those of the first example. In the present example, the surface numbers 1 to 25 in Table 28 correspond to S1 to S25 (the reflecting surface of the mirror B1 is excluded) in FIG. 19. Moreover, in the present example, the third and fourth surfaces are aspherical. The aspherical coefficients of the third and fourth surfaces are as shown in Table 29. In Table 29, $E-n=\times 10^{-n}$.

TABLE 29

| S | k | $A_4$ | $A_6$ | $A_8$ | $A_{10}$ | $A_{12}$ |
|---|---|---|---|---|---|---|
| 3 | 0.27499 | 2.79341E-06 | −5.17548E-10 | −1.17149E-13 | 3.94267E-16 | −8.07877E-20 |
| 4 | −1.310755 | 2.54059E-06 | −1.42874E-10 | −1.53145E-12 | 1.60736E-15 | −8.56735E-19 |

FIGS. 20A to 20D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 30.

TABLE 30

|  | condition (1) | condition (2) | condition (3) | condition (4) |
|---|---|---|---|---|
| tenth example | 8.59 | 6.77 | 2.47 | 3.54 |

Since the values shown in Table 30 all fulfill the conditions (1) to (4), it can be said that the above-mentioned effects by the definitions of the conditions are obtained.

In the projection optical system 1 of the present example, the lens element L11 which is the most enlargement side lens element of the first lens unit G11 has an Abbe number to the d-line of 61.25, i.e., not less than 55, and a refractive index Nd of 1.5891, i.e., not less than 1.50.

In the wide-angle projection optical system 1 of the present example, for example, the outer diameter of the lens element L11 which is the most enlargement side lens element of the first lens unit G11 increases, thereby causing a cost increase. Therefore, giving the lens element L11 an Abbe number Vd to the d-line of not less than 55 and a refractive index Nd of not less than 1.50 makes it possible to form the lens element L11 out of a low-cost and easy-to-process glass material. In this way, increases in the costs of the first lens unit G11 and thus the projection optical system 1 can be avoided.

Moreover, in the projection optical system 1 of the present example, each lens element of the first lens unit G11, the second lens unit G12, and the third lens unit G13 has an Abbe number to the d-line of 75 or less.

As is the case with the present example, the projection optical system 1 which is substantially telecentric on the reduction side frequently employs a glass material that exhibits high anomalous dispersion. However, the glass material exhibiting high anomalous dispersion is costly and inferior in processibility (difficult to process), which leads to a cost increase. Therefore, giving an Abbe number Vd to the d-line of 75 or less to each of the above-mentioned lens elements makes it possible to build each lens unit by using a low-cost and easy-to-process glass material, thereby avoiding the cost increase of the projection optical system 1.

Furthermore, in the projection optical system 1 of the present example, two lens elements L14 and L15 of the second lens unit G12 have refractive indices 1.8061 and 1.7283, respectively; that is, both lens elements have refractive indices of 1.60 or more.

A plurality of positive lens elements used in the second lens unit G12 (the lens elements L14 and L15 in the present example) plays a role in reducing the height of luminous flux which reaches the first lens unit G11. Here, the positive lens elements provided as the lens elements L14 and L15 keeps the various aberrations of the entire system small. Since the lens elements L14 and L15 have refractive indices of 1.60 or more, this effect can be further enhanced.

Even in a case where the second lens unit G12 comprises three or more positive lens elements, the above-mentioned effect can be achieved by setting the refractive index of each lens element at 1.60 or more.

In the projection optical system 1 of the present example, the first lens unit G11 includes a lens element of which at least one of the enlargement side surface and the reduction side surface is aspherical, and the above-mentioned lens element is disposed at a second position from the enlargement side.

In the first lens unit G11, providing the aspherical surface as the most enlargement side lens element L11 increases its diameter, thereby increasing cost burden. Since the lens element L11 is generally formed of a plastic material, the lens element L11 has poor weather resistance and thus requires careful handling. The weather resistance refers to the durability of the resin when directly exposed to outdoor conditions such as light, heat, wind, and rain. On the other hand, in the first lens unit G11, providing the aspherical surface as the third elements L13 which is located at a third position from the enlargement side induces less effects in correcting the aberrations in a wide lens as is the case with the present example.

Accordingly, in the first lens unit G11, providing an aspherical lens as the lens element L12 located at the second position from the enlargement side can well-balancedly achieve effects in reducing a manufacturing cost and correcting the aberrations. Moreover, since the lens element L12 located at the second position from the enlargement side is not exposed outside, it is easy to handle. Even a low cost material having poor weather resistance can be used for the lens element 12.

Eleventh Embodiment

An eleventh embodiment of the present invention will be described with reference to the drawings as follows. The same structures as those of the first to tenth embodiments are denoted by the same reference numerals, and descriptions thereof are omitted.

Figure 21:
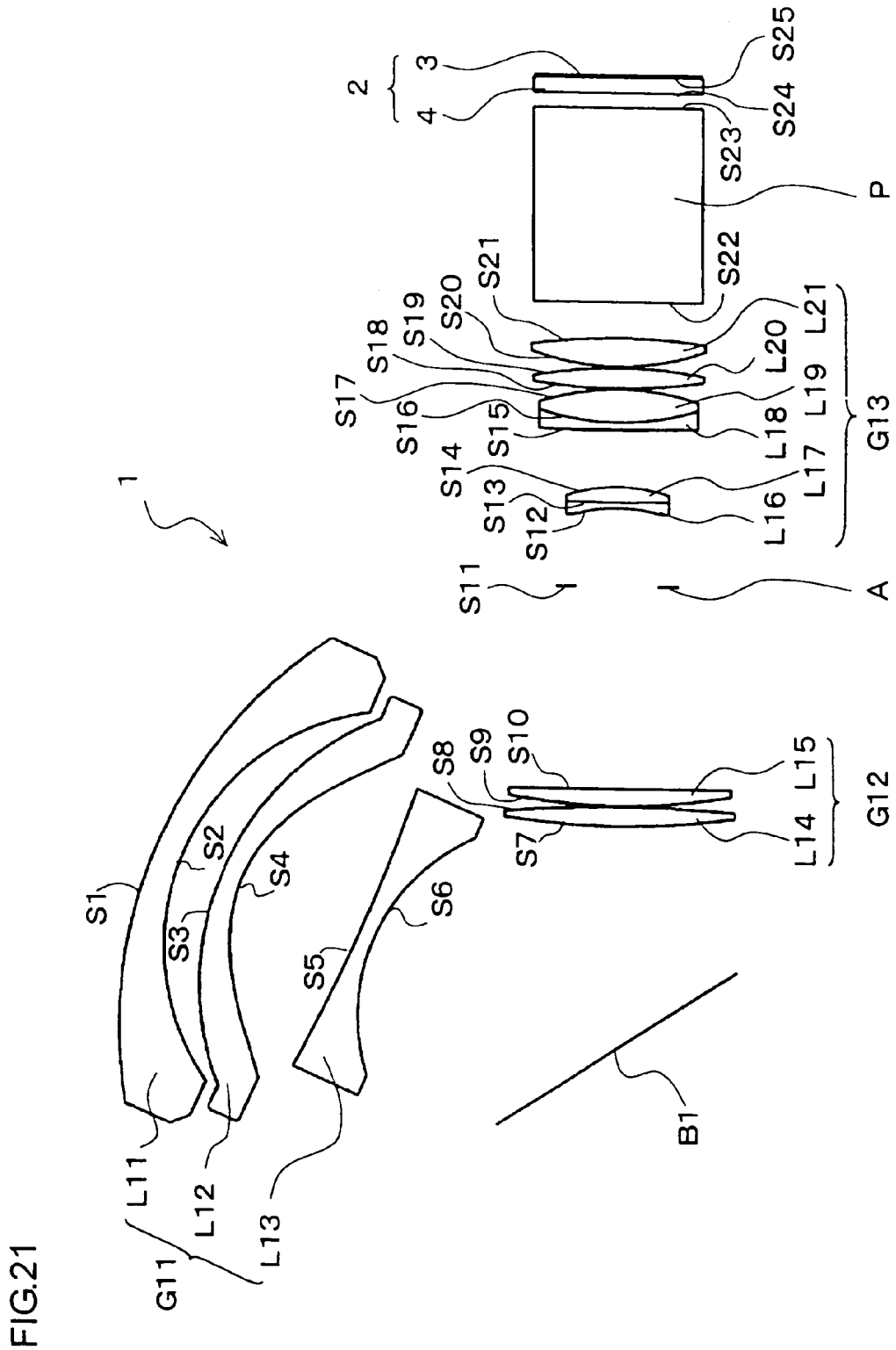
FIG. 21 is an explanatory view showing the schematic structure of a projecting apparatus according to an eleventh embodiment of the present invention.

FIG. 21 is an explanatory view showing the schematic structure of a projecting apparatus according to the present embodiment. In the projecting apparatus of the present embodiment, in the projection optical system 1 of the first embodiment, the lens element L21 having positive optical power is further provided on the reduction side of the lens element L20 of the third lens unit G13, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as an eleventh example.

ELEVENTH EXAMPLE

Table 31 shows the construction data of the projection optical system 1 according to the present example. In the present example, the F number is 2.5, the angle of view (2ω) is 92.3 degrees, the overall focal length FL of the projection optical system 1 is 10.30 mm, and the projection distance is 683 mm.

TABLE 31

| S | CR | T | Nd | Vd |
|---|---|---|---|---|
| 1 | 91.7490 | 5.3000 | 1.5891 | 61.25 |
| 2 | 47.1267 | 8.5424 | 1.0000 | |
| 3 | 57.1177 | 4.0000 | 1.5251 | 56.38 |
| 4 | 29.8856 | 25.3512 | 1.0000 | |
| 5 | −347.0550 | 3.0000 | 1.5891 | 61.25 |
| 6 | 39.1129 | 95.7448 | 1.0000 | |
| 7 | 143.3990 | 3.8457 | 1.7433 | 49.22 |
| 8 | −262.1150 | 0.2000 | 1.0000 | |
| 9 | 120.9900 | 3.3505 | 1.6200 | 36.30 |
| 10 | 6334.1300 | 39.8240 | 1.0000 | |
| 11 | APR | 21.0437 | 1.0000 | |
| 12 | −30.4404 | 1.0000 | 1.8061 | 33.27 |
| 13 | 271.0440 | 3.0862 | 1.4875 | 70.44 |
| 14 | −32.1010 | 11.3702 | 1.0000 | |
| 15 | 476.9190 | 1.5000 | 1.8061 | 33.27 |
| 16 | 49.3454 | 6.5520 | 1.4875 | 70.44 |
| 17 | −51.1172 | 0.2000 | 1.0000 | |
| 18 | 106.6800 | 4.0831 | 1.4875 | 70.44 |
| 19 | −91.0747 | 0.2000 | 1.0000 | |
| 20 | 49.5118 | 5.7027 | 1.4875 | 70.44 |
| 21 | −120.6390 | 7.1000 | 1.0000 | |

TABLE 31-continued

| S | CR | T | Nd | Vd |
|---|---|---|---|---|
| 22 | INF | 38.0000 | 1.6074 | 56.71 |
| 23 | INF | 3.0000 | 1.0000 | |
| 24 | INF | 3.0000 | 1.5085 | 61.19 |
| 25 | INF | 0.5000 | 1.0000 | |

The definitions of S, T, Nd and Vd in Table 31 are similar to those of the first example. In the present example, the surface numbers 1 to 25 in Table 31 correspond to S1 to S25 (the reflecting surface of the mirror B1 is excluded) in FIG. 21. Moreover, in the present example, the fourth surface is aspherical. The aspherical coefficients of the fourth surface are as shown in Table 32. In Table 32, $E-n=\times 10^{-n}$.

TABLE 32

| S | k | $A_4$ | $A_6$ | $A_8$ | $A_{10}$ |
|---|---|---|---|---|---|
| 4 | −1.137677 | 8.83366E−07 | −5.01245E−10 | −7.21272E−13 | 1.09215E−16 |

FIGS. 22A to 22D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 33.

TABLE 33

| | condition (1) | condition (2) | condition (3) | condition (4) |
|---|---|---|---|---|
| eleventh example | 9.30 | 7.46 | 2.55 | 3.52 |

Since the values shown in Table 33 all fulfill the conditions (1) to (4), it can be said that the above-mentioned effects by the definitions of the conditions are obtained.

The projection optical system 1 of the present example has the same configuration as that of the projection optical system 1 of the tenth example as follows.

First, the lens element L11 which is the most enlargement side lens element of the first lens unit G11 has an Abbe number to the d-line of 61.25, i.e., not less than 55, and a refractive index Nd of 1.5891, i.e., not less than 1.50.

Second, each lens element of the first lens unit G11, the second lens unit G12, and the third lens unit G13 has an Abbe number to the d-line of 75 or less.

Third, two lens elements L14 and L15 of the second lens unit G12 have refractive indices of 1.7433 and 1.6200, respectively; that is, both lens elements have refractive indices of 1.60 or more.

Fourth, the first lens unit includes a lens element of which at least one of the enlargement side surface and the reduction side surface is aspherical, and the above-mentioned lens element is disposed at the second position from the enlargement side. That is, the lens element L12 is an aspherical lens element.

Consequently, the same effects as the effects corresponding to the first to fourth structures explained in the tenth example can be obtained.

Twelfth Embodiment

A twelfth embodiment of the present invention will be described with reference to the drawings as follows. The same structures as those of the first to eleventh embodiments are denoted by the same reference numerals, and descriptions thereof are omitted.

Figure 23:
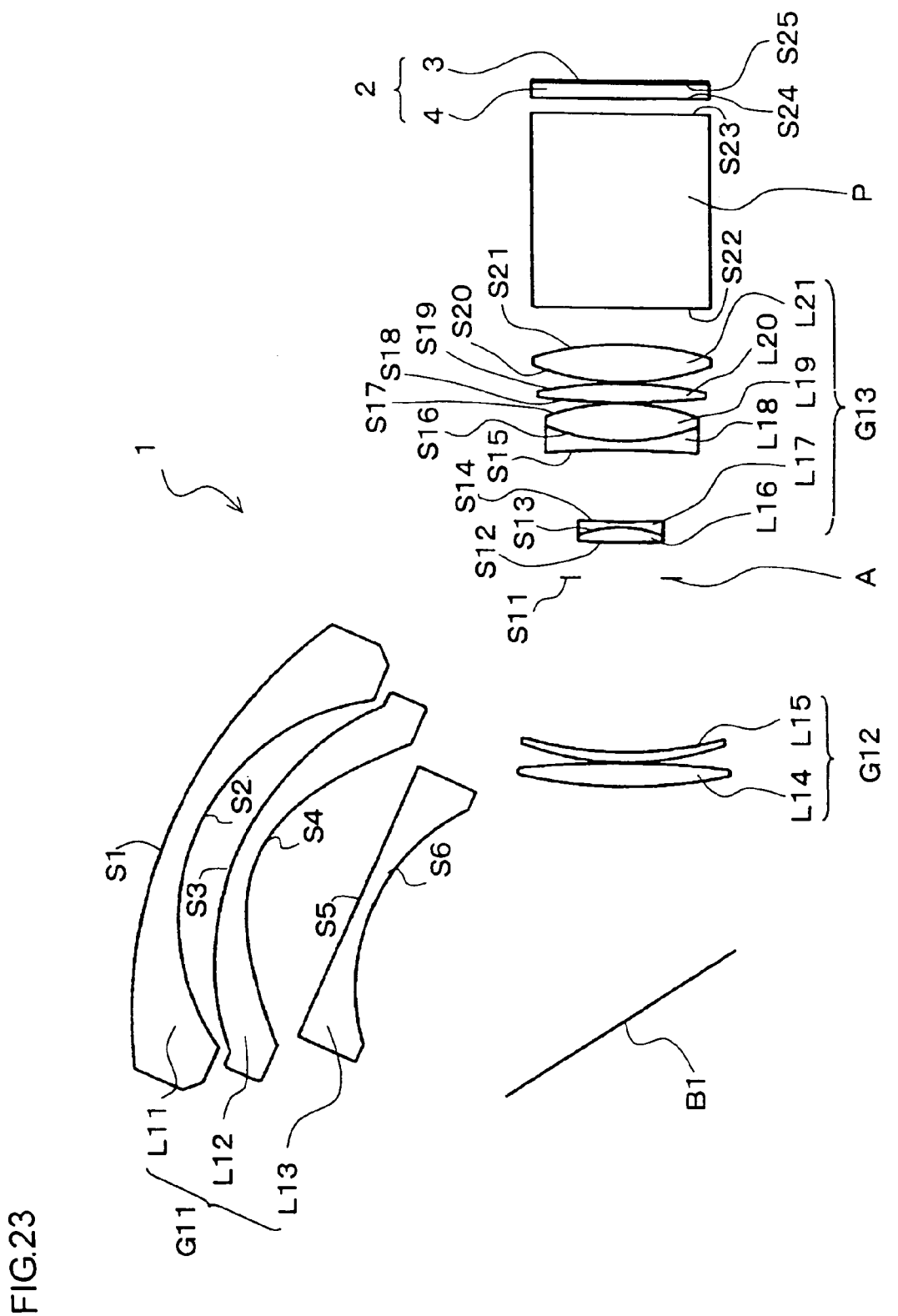
FIG. 23 is an explanatory view showing the schematic structure of a projecting apparatus according to a twelfth embodiment of the present invention.
Figure 24A:
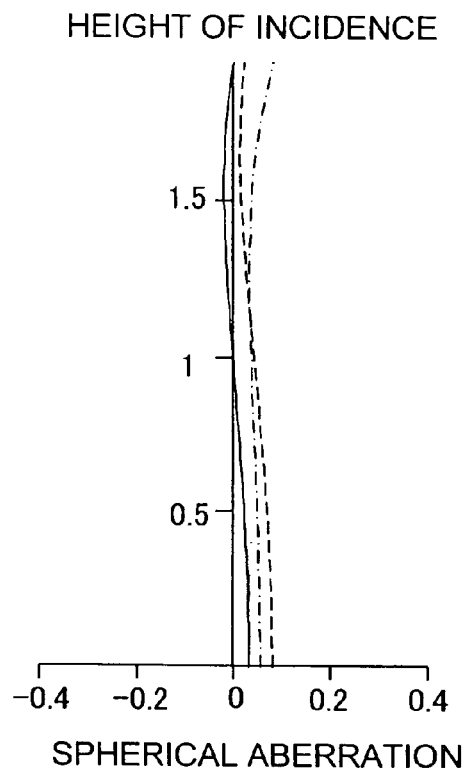
FIGS. 24A to 24D are explanatory views showing aberrations of the twelfth embodiment of the present invention.
Figure 24B:
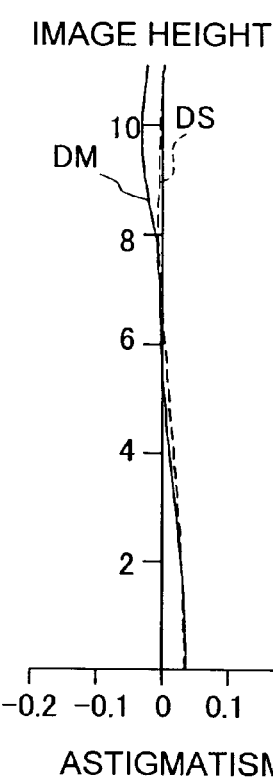
Figure 24C:
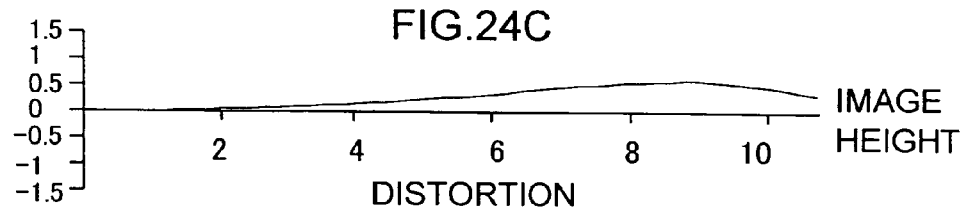
Figure 24D:
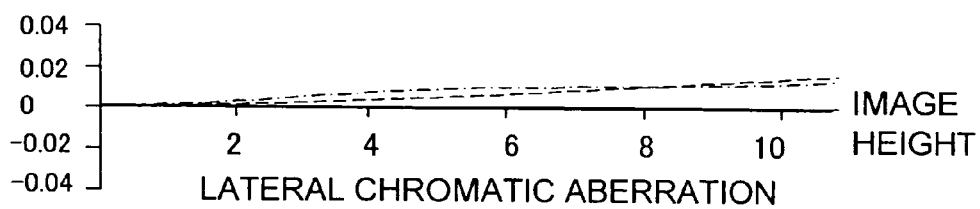

FIG. 23 is an explanatory view showing the schematic structure of a projecting apparatus according to the present embodiment. In the projecting apparatus of the present embodiment, in the projection optical system 1 of the first embodiment, the lens element L21 having positive optical power is further provided on the reduction side of the lens element L20 of the third lens unit G13, and the parameters (the radius of curvature, the axial distance, the refractive index and the Abbe number) of each lens element are optimized accordingly. Except this, the basic structure is similar to that of the first embodiment.

In the present embodiment, the projection optical system 1 is also designed so that the conditions (1) to (4) shown in the first embodiment are fulfilled. The detailed structure of the projection optical system 1 according to the present embodiment will be described as a twelfth example.

TWELFTH EXAMPLE

Table 34 shows the construction data of the projection optical system 1 according to the present example. In the present example, the F number is 2.5, the angle of view (2ω) is 92.6 degrees, the overall focal length FL of the projection optical system 1 is 10.25 mm, and the projection distance is 683 mm.

TABLE 34

| S | CR | T | Nd | Vd |
|---|---|---|---|---|
| 1 | 96.2207 | 5.0000 | 1.5891 | 61.25 |
| 2 | 44.0825 | 8.6751 | 1.0000 | |
| 3 | 45.7905 | 4.0000 | 1.4930 | 58.34 |
| 4 | 24.2511 | 21.3972 | 1.0000 | |
| 5 | −18743.8000 | 2.9000 | 1.5891 | 61.25 |
| 6 | 39.9613 | 99.8865 | 1.0000 | |
| 7 | 95.5649 | 4.5350 | 1.7433 | 49.22 |
| 8 | −194.5050 | 0.2012 | 1.0000 | |
| 9 | 56.7573 | 2.0000 | 1.7552 | 27.53 |
| 10 | 71.0455 | 34.2892 | 1.0000 | |
| 11 | APR | 6.9464 | 1.0000 | |
| 12 | 208.6900 | 3.0021 | 1.5891 | 61.25 |
| 13 | −21.4703 | 1.0286 | 1.8061 | 40.72 |
| 14 | 121.9130 | 14.0480 | 1.0000 | |
| 15 | −177.4610 | 1.8000 | 1.8061 | 33.27 |
| 16 | 38.7300 | 7.5015 | 1.4875 | 70.44 |
| 17 | −40.0741 | 0.2000 | 1.0000 | |
| 18 | 161.2550 | 3.7751 | 1.4875 | 70.44 |
| 19 | −76.2565 | 0.2000 | 1.0000 | |
| 20 | 48.1513 | 7.5779 | 1.4875 | 70.44 |
| 21 | −56.0520 | 7.1000 | 1.0000 | |
| 22 | INF | 38.0000 | 1.6074 | 56.71 |
| 23 | INF | 3.0000 | 1.0000 | |
| 24 | INF | 3.0000 | 1.5085 | 61.19 |
| 25 | INF | 0.5000 | 1.0000 | |

The definitions of S, T, Nd and Vd in Table 34 are similar to those of the first example. In the present example, the surface numbers 1 to 25 in Table 34 correspond to S1 to S25 (the reflecting surface of the mirror B1 is excluded) in FIG. 23. Moreover, in the present example, the third and fourth surfaces are aspherical. The aspherical coefficients of the third and fourth surfaces are as shown in Table 35. In Table 35, E-n=×10$^{-n}$.

TABLE 35

| S | k | $A_4$ | $A_6$ | $A_8$ | $A_{10}$ |
|---|---|---|---|---|---|
| 3 | −9.11349 | 3.53494E−06 | −1.22211E−09 | 1.08670E−12 | −3.38402E−16 |
| 4 | −2.075 | 1.96950E−06 | 1.14573E−09 | −4.05748E−13 | −7.58541E−16 |

FIGS. 24A to 24D are explanatory views showing spherical aberration, astigmatism, distortion and lateral chromatic aberration in the present example. The aberrations are shown in a similar manner to those of the first example.

In the present example, the values of $T_{12}/FL$, $FL_2/FL$, $|FL_1/FL|$ and $LB/FL$ defined by the conditions (1) to (4), respectively, are as shown in Table 36.

TABLE 36

|  | condition (1) | condition (2) | condition (3) | condition (4) |
|---|---|---|---|---|
| twelfth example | 9.75 | 6.72 | 2.58 | 3.54 |

Since the values shown in Table 36 all fulfill the conditions (1) to (4), it can be said that the above-mentioned effects by the definitions of the conditions are obtained.

The projection optical system 1 of the present example has the same configuration as those of the projection optical systems 1 of the tenth and eleventh examples as follows.

First, the lens element L11 which is the most enlargement side lens element of the first lens unit G11 has an Abbe number to the d-line of 61.25, i.e., not less than 55, and a refractive index Nd of 1.5891, i.e., not less than 1.50.

Second, each lens element of the first lens unit G11, the second lens unit G12, and the third lens unit G13 has an Abbe number to the d-line of 75 or less.

Third, two lens elements L14 and L15 of the second lens unit G12 have refractive indices of 1.7433 and 1.7552, respectively; that is, both lens elements have refractive indices of 1.60 or more.

Fourth, the first lens unit G11 includes a lens element of which at least one of the enlargement side surface and the reduction side surface is aspherical, and the above-mentioned lens element is disposed at the second position from the enlargement side. That is, the lens element L12 is an aspherical lens element.

Consequently, the same effects as the effects corresponding to the first to fourth structures explained in the tenth example can be obtained.

While examples using the DMD 3 as a display device are described in the above, for example, a reflective or transmissive liquid crystal display may be used.

Moreover, while the lens units of the above-described embodiments comprise only refractive type lens elements that deflect the incident ray by refraction (that is, lens elements of a type in which the incident ray is deflected at the interface between media having different refractive indices), the present invention is not limited thereto. For example, the lens units may comprise diffractive type lens elements that deflect the incident ray by diffraction, refractive-diffractive hybrid lens elements that deflect the incident ray by a combination of diffraction and refraction, or gradient index lens elements that deflect the incident ray by the distribution of refractive index in the medium.

As described above, the projection optical system of the present invention is a projection optical system comprising from the enlargement side: a first lens unit having negative optical power; an optical path bending member (for example, a mirror or a prism) that bends the optical path at a reflecting surface; a second lens unit comprising a plurality of positive lens elements and having positive optical power; and a third lens unit having positive optical power, and fulfilling the following condition (1):

$$5.5 < T_{12}/FL < 12.0 \tag{1}$$

where $T_{12}$ is the air equivalent distance between the first lens unit and the second lens unit and FL is the overall focal length of the projection optical system.

By thus appropriately setting the space for disposing the optical path bending member, the thickness of the projecting apparatus can be reduced while an increase in the cost of the projection optical system is suppressed.

It is preferable that the projection optical system of the present invention further fulfill the following condition (2):

$$2.0 < FL_2/FL < 8.0 \tag{2}$$

where $FL_2$ is the focal length of the second lens unit.

When the upper limit of the condition (2) is exceeded, since the positive optical power of the second lens unit is too weak, the width of the luminous flux from the second lens unit to the first lens unit is not reduced, so that it is necessary that the air equivalent distance $T_{12}$ be long. Consequently, the diameter of the first lens unit increases to increase the cost. Conversely, when the lower limit of the condition (2) is exceeded, since the positive optical power of the second lens unit is too strong and aberrations increase accordingly, the performance of the projection optical system is degraded.

Therefore, by designing the projection optical system so that the condition (2) is further fulfilled, the generation of aberrations can be reduced while an increase in the cost of the projection optical system is suppressed, so that the degradation of the performance of the projection optical system can be avoided.

It is preferable that the projection optical system of the present invention further fulfill the following condition (3):

$$1.0 < |FL_1/FL| < 5.0 \tag{3}$$

where $FL_1$ is the focal length of the first lens unit.

When the upper limit of the condition (3) is exceeded, since the negative optical power of the first lens unit is too weak, it is difficult to secure a long back focal distance. Conversely, when the lower limit of the condition (3) is exceeded, since the negative optical power of the first lens unit is too strong, it is difficult to correct off-axial aberrations, so that the performance of the projection optical system is degraded.

Therefore, by designing the projection optical system so that the condition (3) is further fulfilled, off-axial aberrations can be reduced while a long back focal distance is secured, so that the degradation of the performance of the projection optical system can be avoided.

It is preferable that the projection optical system of the present invention further fulfill the following condition (4):

$$1.5 < LB/FL < 6.0 \quad (4)$$

where LB is the lens back focal distance which is an air equivalent length from the most reduction side lens surface of the third lens unit to the reduction side image surface (the display surface of the display device).

When the upper limit of the condition (4) is exceeded, to secure a long back focal distance, it is necessary to increase the negative optical power of the first lens unit and aberrations increase accordingly, so that the performance is degraded. Conversely, when the lower limit of the condition (4) is exceeded, a long back focal distance cannot be obtained.

Therefore, by designing the projection optical system so that the condition (4) is further fulfilled, the generation of aberrations can be reduced to thereby avoid the performance degradation, and a long back focal distance can be secured.

In the projection optical system of the present invention, it is preferable that the second lens unit comprise two positive lens elements.

In the case of this structure, compared to when the second lens unit comprises one positive lens element, the generation of aberrations can be suppressed. Moreover, since the second lens unit comprises two positive lens elements which are a minimum necessary number of lens elements, an increase in the cost of the second lens unit can be suppressed.

In the projection optical system of the present invention, it is preferable that the most enlargement side positive lens element of the second lens unit is a positive lens element convex to the enlargement side.

In this case, compared to when the most enlargement side positive lens element of the second lens unit is a positive lens element concave to the enlargement side, the generation of aberrations can be reduced to thereby avoid the degradation of the performance of the projection optical system.

In the projection optical system of the present invention, it is preferable that the first lens unit include a lens element at least one of the enlargement side and reduction side surfaces of which is aspherical. In this case, aberrations can be well-balancedly corrected.

In the projection optical system of the present invention, the third lens unit may comprise from the enlargement side: a doublet lens element comprising a negative lens element concave to the enlargement side and a positive lens element convex to the reduction side which lens elements are cemented together; a doublet lens element comprising a negative lens element and a positive lens element convex to the reduction side which lens elements are cemented together; and at least one positive lens element. Moreover, the third lens unit may comprise from the enlargement side: a bi-concave negative lens element; a bi-convex positive lens element (non-cemented with the above-mentioned negative lens element); a doublet lens element comprising a negative lens element and a positive lens element convex to the reduction side which lens elements are cemented together; and at least one positive lens element. According to these structures, lateral chromatic aberration can be effectively reduced.

In the projection optical system of the present invention, the third lens unit may comprise from the enlargement side: a doublet lens element comprising a negative lens element concave to the enlargement side and a positive lens element convex to the reduction side which lens elements are cemented together; a negative lens element; a positive lens element convex to the reduction side (non-cemented with the above-mentioned negative lens element); and at least one positive lens element. Moreover, the third lens unit may comprise from the enlargement side: a bi-concave negative lens element; a bi-convex positive lens element (non-cemented with the above-mentioned negative lens element); a negative lens element; a positive lens element convex to the reduction side (non-cemented with the above-mentioned negative lens element); and at least one positive lens element. According to these structures, lateral chromatic aberration can also be effectively reduced.

That is, to effectively reduce lateral chromatic aberration, at the third lens unit, the combination of the most enlargement side two positive and negative lens elements and the succeeding enlargement side two positive and negative lens elements are one of the following: (a) a cemented lens element and a cemented lens element; (b) a cemented lens element and a non-cemented lens element; (c) a non-cemented lens element and a cemented lens element; and (d) anon-cemented lens element and a non-cemented lens element.

The projection optical system of the present invention is preferably configured such that the most enlargement side lens element of the first lens unit has an Abbe number to the d-line of not less than 55, and a refractive index of not less than 1.50. According to this configuration, the above-mentioned lens element can be formed of a low-cost and easy-to-process glass material. In this way, increases in the costs of the first lens unit and thus the projection optical system can be avoided.

The projection optical system of the present invention is preferably configured such that each lens element of the first lens unit, the second lens unit, and the third lens unit has an Abbe number to the d-line of 75 or less. According to this configuration, each lens unit can be formed of a low-cost and easy-to-process glass material, thereby avoiding the cost increase of the projection optical system.

The projection optical system of the present invention is preferably configured such that at least two lens elements of the second lens unit have refractive indices of 1.60 or more. According to this configuration, the various aberrations can be reliably kept small.

The projection optical system of the present invention is preferably configured such that the first lens unit has a lens element of which at least one of the enlargement side surface and the reduction side surface is aspherical, and the above-mentioned lens element is disposed at a second position from the enlargement side. According to this configuration, effects in reducing a manufacturing cost and correcting the aberrations can be well-balancedly provided.

The projection apparatus of the present invention is preferably configured to include the above-mentioned projection optical system and a display element which supplies the above-mentioned projection optical system with light corresponding to a display image. According to this configuration, the thickness of the projection apparatus can be reduced while suppressing an increase in the cost of the entire apparatus.

Obviously, many modifications and variations of the present invention are possible in light of the above teachings. It is therefore to be understood that within the scope of the appended claims, the invention may be practiced other than as specifically described.

What is claimed is:

1. A projection optical system comprising from an enlargement side:
   a first lens unit having negative optical power;
   an optical path bending member that bends an optical path at a reflecting surface;
   a second lens unit comprising a plurality of positive lens elements and having positive optical power; and
   a third lens unit having positive optical power,
   wherein the following condition (1) is fulfilled:

$$5.5 < T_{12}/FL < 12.0 \quad (1)$$

where $T_{12}$ is an air equivalent distance between said first lens unit and said second lens unit and FL is an overall focal length of said projection optical system.

2. The projection optical system as claimed in claim 1, wherein the following condition (1') is further fulfilled:

$$5.9 < T_{12}/FL < 10.6 \quad (1').$$

3. The projection optical system as claimed in claim 1, wherein the following condition (2) is further fulfilled:

$$2.0 < FL_2/FL < 8.0 \quad (2)$$

where $FL_2$ is a focal length of said second lens unit.

4. The projection optical system as claimed in claim 1, wherein the following condition (2') is further fulfilled:

$$4.0 < FL_2/FL < 6.0 \quad (2')$$

where $FL_2$ is a focal length of said second lens unit.

5. The projection optical system as claimed in claim 1, wherein the following condition (3) is further fulfilled:

$$1.0 < |FL_1|/FL < 5.0 \quad (3)$$

where $FL_1$ is a focal length of said first lens unit.

6. The projection optical system as claimed in claim 1, wherein the following condition (3') is further fulfilled:

$$1.5 < |FL_1|/FL < 3.5 \quad (3')$$

where $FL_1$ is a focal length of said first lens unit.

7. The projection optical system as claimed in claim 1, wherein the following condition (4) is further fulfilled:

$$1.5 < LB/FL < 6.0 \quad (4)$$

where LB is a lens back focal distance which is an air equivalent length from a most reduction side lens surface of said third lens unit to a reduction side image surface.

8. The projection optical system as claimed in claim 1, wherein the following condition (4') is further fulfilled:

$$2.0 < LB/FL < 4.0 \quad (4')$$

where LB is a lens back focal distance which is an air equivalent length from a most reduction side lens surface of said third lens unit to a reduction side image surface.

9. The projection optical system as claimed in claim 1, wherein said second lens unit comprises two positive lens elements.

10. The projection optical system as claimed in claim 9, wherein a most enlargement side positive lens element of said second lens unit is a positive lens element convex to the enlargement side.

11. The projection optical system as claimed in claim 1, wherein said first lens unit includes a lens element at least one of an enlargement side surface and a reduction side surface of which is aspherical.

12. The projection optical system as claimed in claim 1, wherein said third lens unit comprises from the enlargement side:
    a doublet lens element comprising a negative lens element concave to the enlargement side and a positive lens element convex to a reduction side which lens elements are cemented together;
    a doublet lens element comprising a negative lens element and a positive lens element convex to the reduction side which lens elements are cemented together; and
    at least one positive lens element.

13. The projection optical system as claimed in claim 1, wherein said third lens unit comprises from the enlargement side:
    a bi-concave negative lens element;
    a bi-convex positive lens element;
    a doublet lens element comprising a negative lens element and a positive lens element convex to a reduction side which lens elements are cemented together; and
    at least one positive lens element.

14. The projection optical system as claimed in claim 1, wherein a most enlargement side lens element of said first lens unit has an Abbe number to a d-line of not less than 55 and a refractive index of not less than 1.50.

15. The projection optical system as claimed in claim 1, wherein each lens element of said first lens unit, said second lens unit, and said third lens unit has an Abbe number to a d-line of 75 or less.

16. The projection optical system as claimed in claim 1, wherein at least two lens elements of said second lens unit have refractive indices of 1.60 or more.

17. The projection optical system as claimed in claim 1, wherein said first lens unit includes a lens element of which at least one of an enlargement side surface and a reduction side surface is aspherical, and
    wherein said lens element is disposed at a second position from the enlargement side.

18. A projecting apparatus comprising:
    a projection optical system; and
    a display device that supplies said projection optical system with light corresponding to a display image,
    wherein said projection optical system comprises from an enlargement side:
    a first lens unit having negative optical power;
    an optical path bending member that bends an optical path at a reflecting surface;
    a second lens unit comprising a plurality of positive lens elements and having positive optical power; and
    a third lens unit having positive optical power, and
    wherein the following condition (1) is fulfilled:

$$5.5 < T_{12}/FL < 12.0 \quad (1)$$

where $T_{12}$ is an air equivalent distance between said first lens unit and said second lens unit and FL is an overall focal length of said projection optical system.

19. The projecting apparatus as claimed in claim 18, wherein the following condition (2) is further fulfilled:

$$2.0 < FL_2/FL < 8.0 \quad (2)$$

where $FL_2$ is a focal length of said second lens unit.

20. The projecting apparatus as claimed in claim 18, wherein the following condition (3) is further fulfilled:

$$1.0 < |FL_1|/FL < 5.0 \quad (3)$$

where $FL_1$ is a focal length of said first lens unit.

21. The projecting apparatus as claimed in claim 18, wherein the following condition (4) is further fulfilled:

$$1.5 < LB/FL < 6.0 \qquad (4)$$

where LB is a lens back focal distance which is an air equivalent length from a most reduction side lens surface of said third lens unit to a reduction side image surface.

22. The projecting apparatus as claimed in claim 18, wherein said second lens unit comprises two positive lens elements.

23. The projecting apparatus as claimed in claim 22, wherein a most enlargement side positive lens element of said second lens unit is a positive lens element convex to the enlargement side.

24. The projecting apparatus as claimed in claim 18, wherein said first lens unit includes a lens element at least one of an enlargement side surface and a reduction side surface of which is aspherical.

25. The projecting apparatus as claimed in claim 18, wherein a most enlargement side lens element of said first lens unit has an Abbe number to a d-line of not less than 55 and a refractive index of not less than 1.50.

26. The projecting apparatus as claimed in claim 18, wherein each lens element of said first lens unit, said second lens unit, and said third lens unit has an Abbe number to a d-line of 75 or less.

27. The projecting apparatus as claimed in claim 18, wherein at least two lens elements of said second lens unit have refractive indices of 1.60 or more.

28. The projecting apparatus as claimed in claim 18, wherein said first lens unit includes a lens element of which at least one of an enlargement side surface and a reduction side surface is aspherical, and wherein said lens element is disposed at a second position from the enlargement side.

* * * * *